United States Patent
Amano et al.

(10) Patent No.: US 7,979,741 B2
(45) Date of Patent: *Jul. 12, 2011

(54) METHOD AND APPARATUS FOR DATA RECOVERY SYSTEM USING STORAGE BASED JOURNALING

(75) Inventors: Takashi Amano, Sunnyvale, CA (US); Kenji Yamagami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,002

(22) Filed: Jun. 11, 2010

(65) Prior Publication Data

US 2010/0251020 A1  Sep. 30, 2010

Related U.S. Application Data

(63) Continuation of application No. 12/143,419, filed on Jun. 20, 2008, now Pat. No. 7,761,741, which is a continuation of application No. 10/931,543, filed on Aug. 31, 2004, now Pat. No. 7,398,422, which is a continuation-in-part of application No. 10/621,791, filed on Jul. 16, 2003, now abandoned, and a continuation-in-part of application No. 10/608,391, filed on Jun. 26, 2003, now Pat. No. 7,111,136.

(51) Int. Cl.
*G06F 11/00* (2006.01)
(52) U.S. Cl. .......... 714/19; 714/6; 714/20; 711/161; 711/162
(58) Field of Classification Search .......... 714/6, 19, 714/20; 711/161, 162; 707/202–204
See application file for complete search history.

(56) References Cited

U.S. PATENT DOCUMENTS

| | | |
|---|---|---|
| 4,077,059 A | 2/1978 | Cordi et al. |
| 4,819,156 A | 4/1989 | DeLorme et al. |
| 4,823,261 A | 4/1989 | Bank et al. |
| 5,065,311 A | 11/1991 | Masai et al. |
| 5,086,502 A | 2/1992 | Malcolm |
| 5,263,154 A | 11/1993 | Eastridge et al. |
| 5,280,611 A | 1/1994 | Mohan et al. |
| 5,369,757 A | 11/1994 | Spiro et al. |
| 5,404,508 A | 4/1995 | Konrad et al. |
| 5,479,654 A | 12/1995 | Squibb |
| 5,551,003 A | 8/1996 | Mattson et al. |
| 5,555,371 A | 9/1996 | Duyanovich et al. |

(Continued)

FOREIGN PATENT DOCUMENTS

JP  03103941  4/1991

(Continued)

OTHER PUBLICATIONS

"Continuous Data Protection: Business Continuity for the Era of Networked Storage", Aberdeen Group, Inc., Boston, MA, Jul. 2003.

(Continued)

*Primary Examiner* — Philip Guyton
(74) *Attorney, Agent, or Firm* — Mattingly & Malur, PC

(57) ABSTRACT

A storage system maintains a journal and a snapshot of one or more data volumes. Two journal entry types are maintained, an AFTER journal entry and a BEFORE journal entry. Two modes of data recovery are provided: "fast" recovery and "undo-able" recovery. A combination of both recovery modes allows the user to quickly recover a targeted data state.

12 Claims, 29 Drawing Sheets

U.S. PATENT DOCUMENTS

| | | | |
|---|---|---|---|
| 5,644,696 A | 7/1997 | Pearson et al. | |
| 5,664,186 A | 9/1997 | Bennett et al. | |
| 5,680,640 A | 10/1997 | Ofek et al. | |
| 5,701,480 A | 12/1997 | Raz | |
| 5,720,029 A | 2/1998 | Kern et al. | |
| 5,721,918 A | 2/1998 | Nilsson et al. | |
| 5,751,997 A | 5/1998 | Kullick et al. | |
| 5,835,953 A | 11/1998 | Ohran | |
| 5,867,668 A | 2/1999 | Spirakis et al. | |
| 5,870,758 A | 2/1999 | Bamford et al. | |
| 5,987,575 A | 11/1999 | Yamaguchi | |
| 6,081,875 A | 6/2000 | Clifton et al. | |
| 6,128,630 A | 10/2000 | Shackelford | |
| 6,154,852 A | 11/2000 | Amundson et al. | |
| 6,189,016 B1 | 2/2001 | Cabrera et al. | |
| 6,269,381 B1 | 7/2001 | St. Pierre et al. | |
| 6,269,431 B1 | 7/2001 | Dunham | |
| 6,298,345 B1 | 10/2001 | Armstrong et al. | |
| 6,301,677 B1 | 10/2001 | Squibb | |
| 6,324,654 B1 | 11/2001 | Wahl et al. | |
| 6,353,878 B1 | 3/2002 | Dunham | |
| 6,397,351 B1 | 5/2002 | Miller et al. | |
| 6,442,706 B1 | 8/2002 | Wahl et al. | |
| 6,463,501 B1 | 10/2002 | Kern et al. | |
| 6,473,775 B1 | 10/2002 | Kusters et al. | |
| 6,539,462 B1 | 3/2003 | Mikkelsen et al. | |
| 6,560,614 B1 | 5/2003 | Barboy et al. | |
| 6,587,970 B1 | 7/2003 | Wang et al. | |
| 6,594,781 B1 | 7/2003 | Komasaka et al. | |
| 6,658,434 B1 | 12/2003 | Watanabe et al. | |
| 6,665,815 B1 | 12/2003 | Goldstein et al. | |
| 6,691,245 B1 | 2/2004 | DeKoning | |
| 6,711,409 B1 | 3/2004 | Zavgren et al. | |
| 6,711,572 B2 | 3/2004 | Zakharov et al. | |
| 6,728,747 B1 | 4/2004 | Jenkins et al. | |
| 6,732,125 B1 | 5/2004 | Autrey et al. | |
| 6,742,138 B1 | 5/2004 | Gagne et al. | |
| 6,772,303 B2 | 8/2004 | Crockett et al. | |
| 6,772,306 B2 | 8/2004 | Suzuki et al. | |
| 6,816,872 B1 | 11/2004 | Squibb | |
| 6,829,819 B1 | 12/2004 | Crue et al. | |
| 6,832,289 B2 | 12/2004 | Johnson | |
| 6,839,819 B2 | 1/2005 | Martin | |
| 6,842,825 B2 | 1/2005 | Geiner et al. | |
| 6,898,688 B2 | 5/2005 | Martin et al. | |
| 6,915,315 B2 | 7/2005 | Autrey et al. | |
| 6,950,915 B2 | 9/2005 | Ohno et al. | |
| 6,978,282 B1 | 12/2005 | Dings et al. | |
| 6,981,114 B1 | 12/2005 | Wu et al. | |
| 7,007,043 B2 | 2/2006 | Farmer et al. | |
| 7,010,645 B2 | 3/2006 | Hetzler et al. | |
| 7,020,755 B2 | 3/2006 | Gibble et al. | |
| 7,031,986 B2 | 4/2006 | Ito | |
| 7,036,043 B2 | 4/2006 | Martin et al. | |
| 7,065,620 B2 | 6/2006 | Ballard et al. | |
| 7,099,875 B2 | 8/2006 | Kedem et al. | |
| 7,111,136 B2 | 9/2006 | Yamagami | |
| 7,143,317 B2 | 11/2006 | Lyle et al. | |
| 7,197,665 B2 | 3/2007 | Goldstein et al. | |
| 7,203,732 B2 | 4/2007 | McCabe et al. | |
| 7,222,194 B2 | 5/2007 | Kano et al. | |
| 7,231,544 B2 | 6/2007 | Tan et al. | |
| 7,237,075 B2 | 6/2007 | Welsh et al. | |
| 7,243,115 B2 | 7/2007 | Manley et al. | |
| 7,293,068 B2 | 11/2007 | Katsuragi et al. | |
| 7,334,098 B1 | 2/2008 | Poston | |
| 7,346,623 B2 | 3/2008 | Prahlad et al. | |
| 7,356,657 B2 | 4/2008 | Mikami | |
| 7,360,046 B2 | 4/2008 | Shono et al. | |
| 7,568,080 B2 | 7/2009 | Prahlad et al. | |
| 7,730,213 B2 | 6/2010 | Howard | |
| 7,761,741 B2 * | 7/2010 | Amano et al. | 714/19 |
| 2004/0068636 A1 | 4/2004 | Jacobson et al. | |
| 2004/0139128 A1 | 7/2004 | Becker et al. | |
| 2004/0153558 A1 | 8/2004 | Gunduc et al. | |
| 2004/0225689 A1 | 11/2004 | Dettinger et al. | |
| 2005/0108302 A1 | 5/2005 | Rand et al. | |
| 2005/0256811 A1 | 11/2005 | Pagel et al. | |

FOREIGN PATENT DOCUMENTS

| | | |
|---|---|---|
| JP | 05002517 | 1/1993 |
| JP | 11353215 | 12/1999 |
| JP | 2000155708 | 6/2000 |
| WO | 03092166 | 11/2003 |

OTHER PUBLICATIONS

"Making ROI a Snap: Leveraging the Power of Snapshot Technology with ComVault TM, QiNetix TM, Quick Recovery", CommVault Systems, Inc., Oceanport, NJ, 2002.

"QiNetix Quick Recovery: Snapshot Management and Recovery", CommVault Systems, Inc., Oceanport, NJ, 2005.

"QiNetix: Quick Recovery for Microsoft Exchange", CommVault Systems, Inc, Oceanport, NJ, 2003.

Bohannon et al., "Distributed Multi-Level Recovery in Main-Memory Databases", Proceedings of the 4th International Conference on Parallel and Distributed Information Systems, pp. 45-55, 1996.

Elnozahy et al., "A Survey of Rollback-Recovery Protocols in Message-Passing Systems", ACM Computing Surveys 34:375-408, Sep. 2002.

Hunnicutt et al., "Mission Data Storage Consolidation (MDSC)", Space Ops 2002 Conference, Paper ID: T2071, 2002.

Lomet et al., "Efficient Transparent Application Recovery in Client-Server Information Systems", Proceedings of 1998 ACM SIGMOD International Conference on Management of Data, pp. 460-471, 1998.

Park et al., "An Efficient Recovery Scheme for Mobile Computing Environments", Proceedings of the 8th International Conference on Parallel and Distributed Systems, 2001.

Thatte, "Persistent Memory: A Storage Architecture for Object-Oriented Database Systems", Proceedings of the ACM/IEEE International Workshop on Object-Oriented Database Systems, Pacific Grove, CA, pp. 148-159, 1986.

* cited by examiner

Fig. 3 MT (Management Table) 108

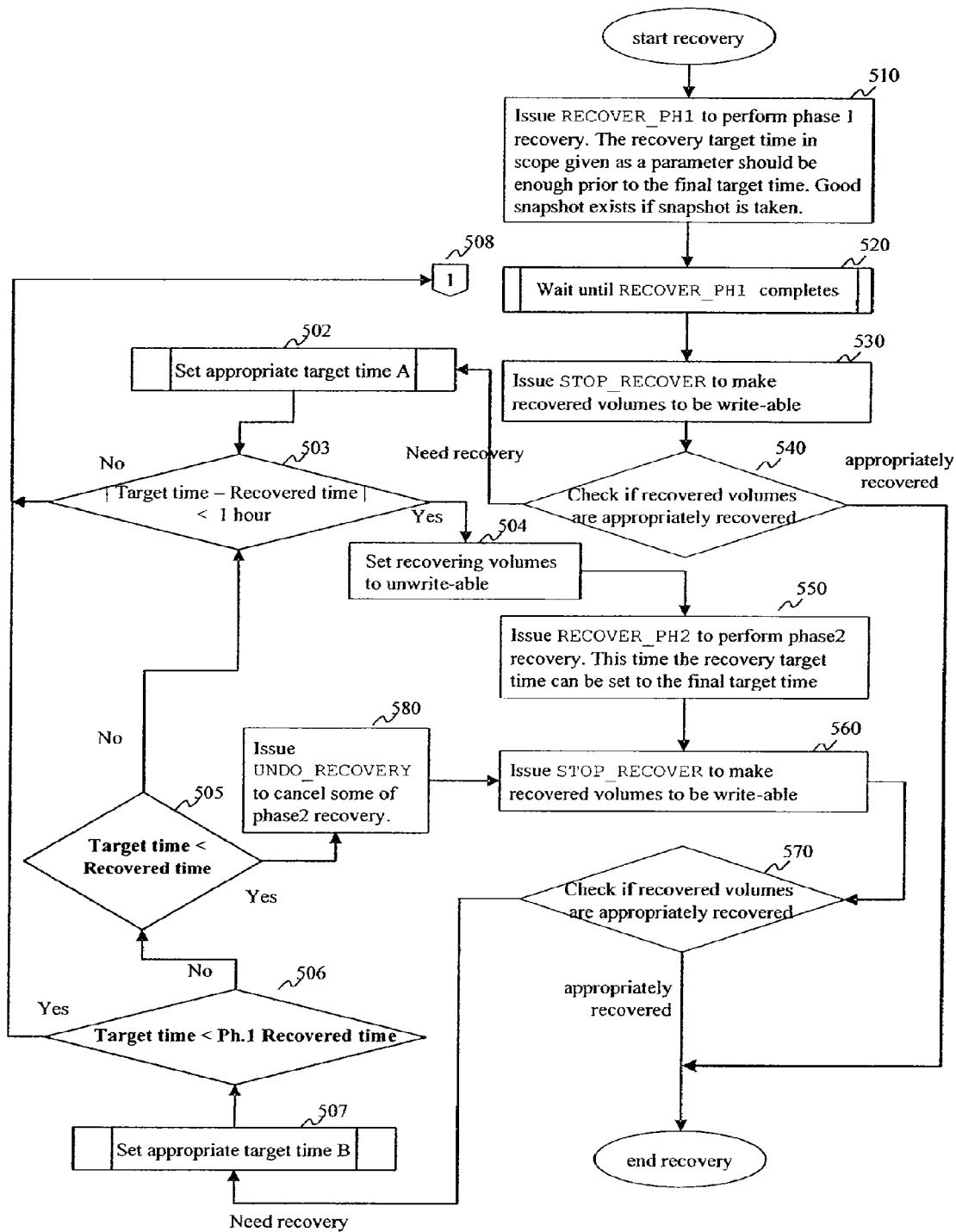
Fig. 5 Recovery procedure

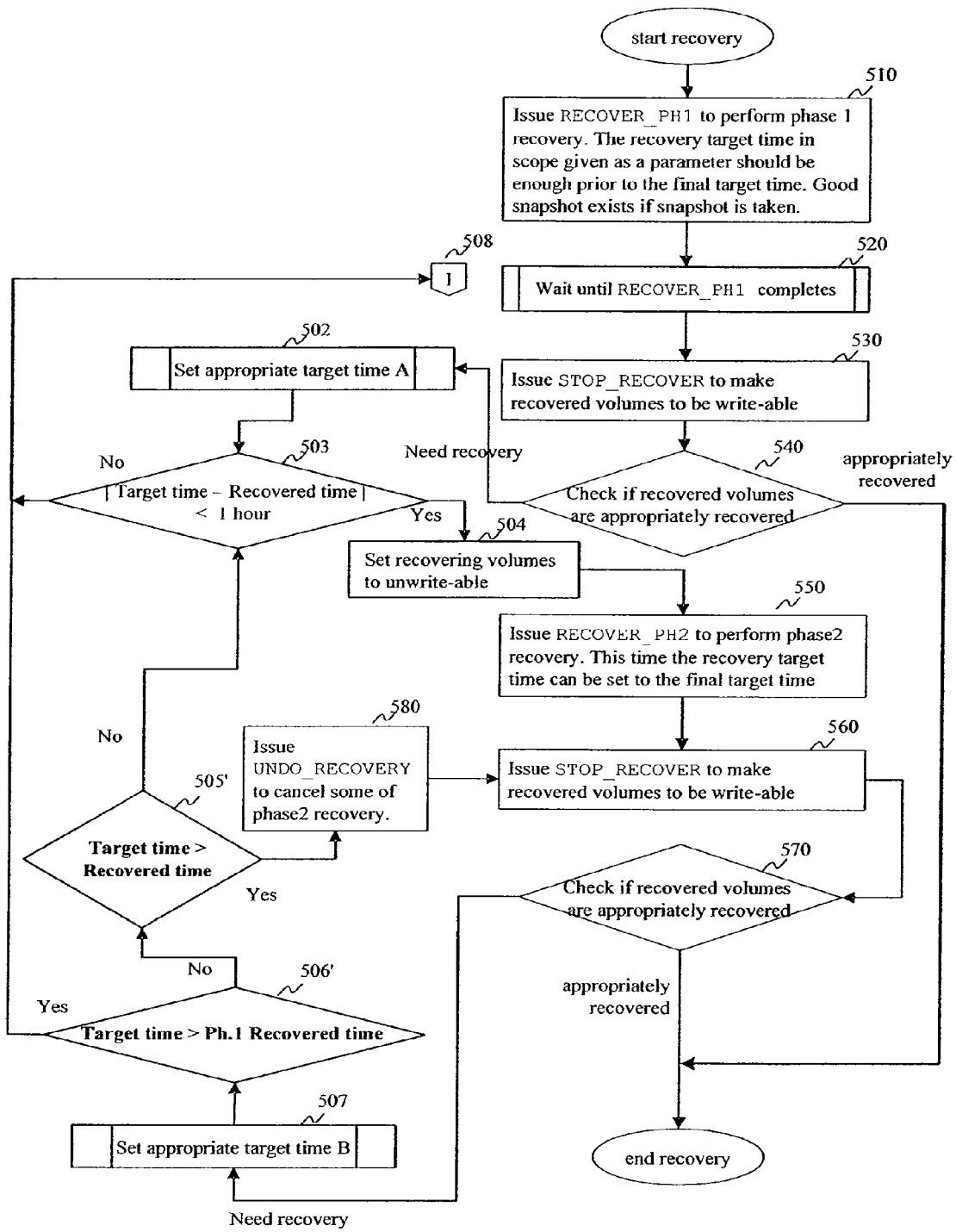
Fig. 5A Recovery procedure

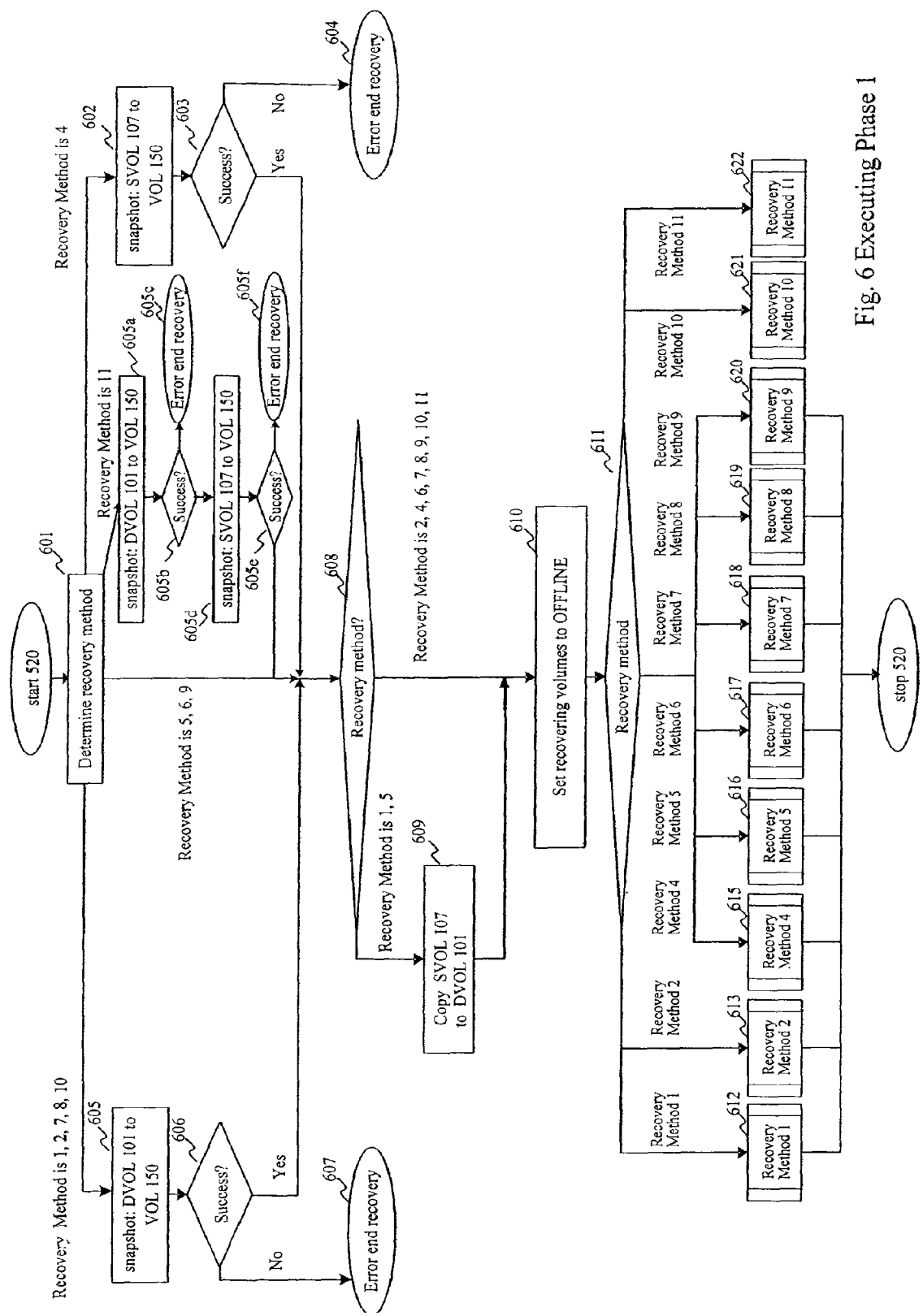
Fig. 6 Executing Phase 1

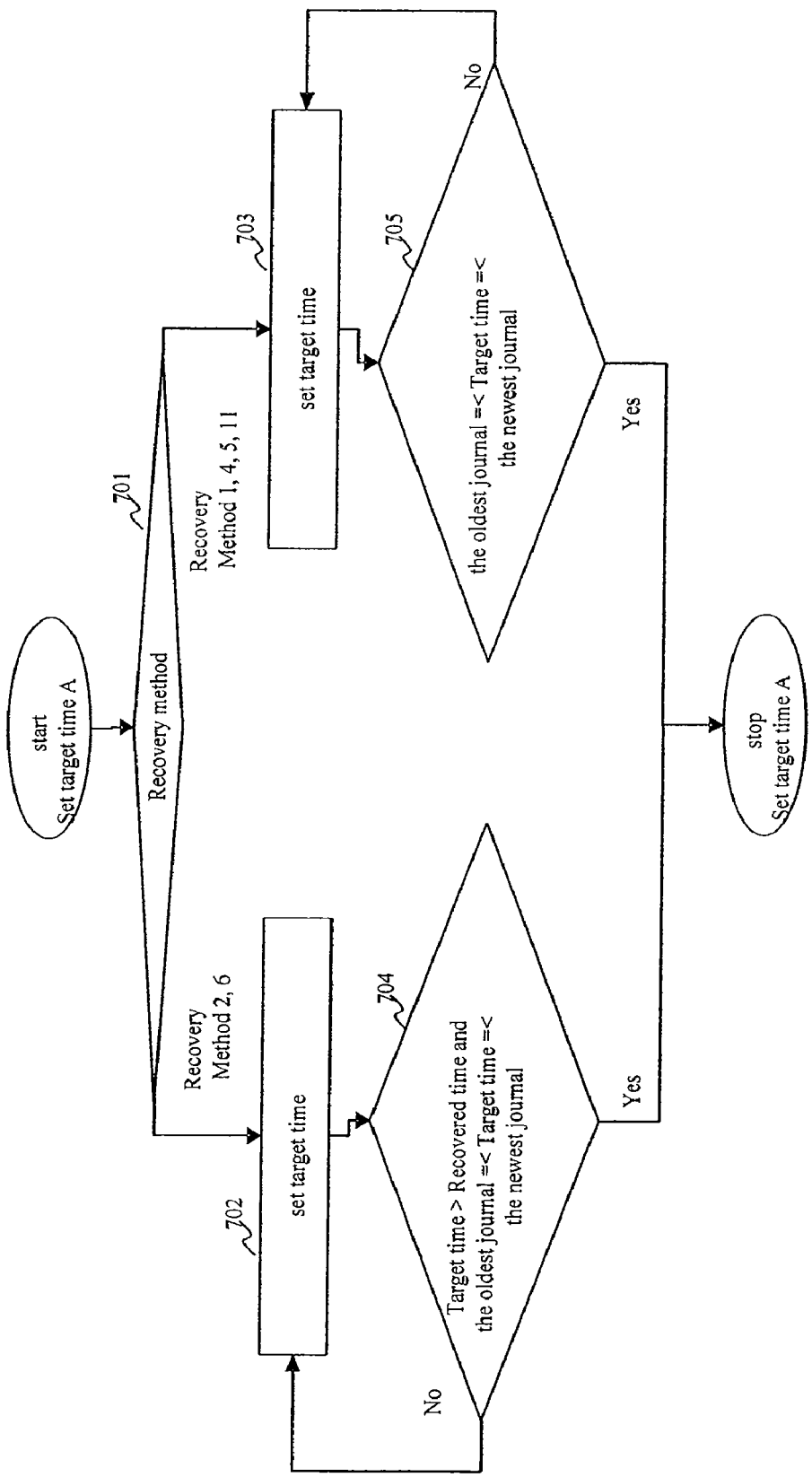
Fig. 7 Setting target time A

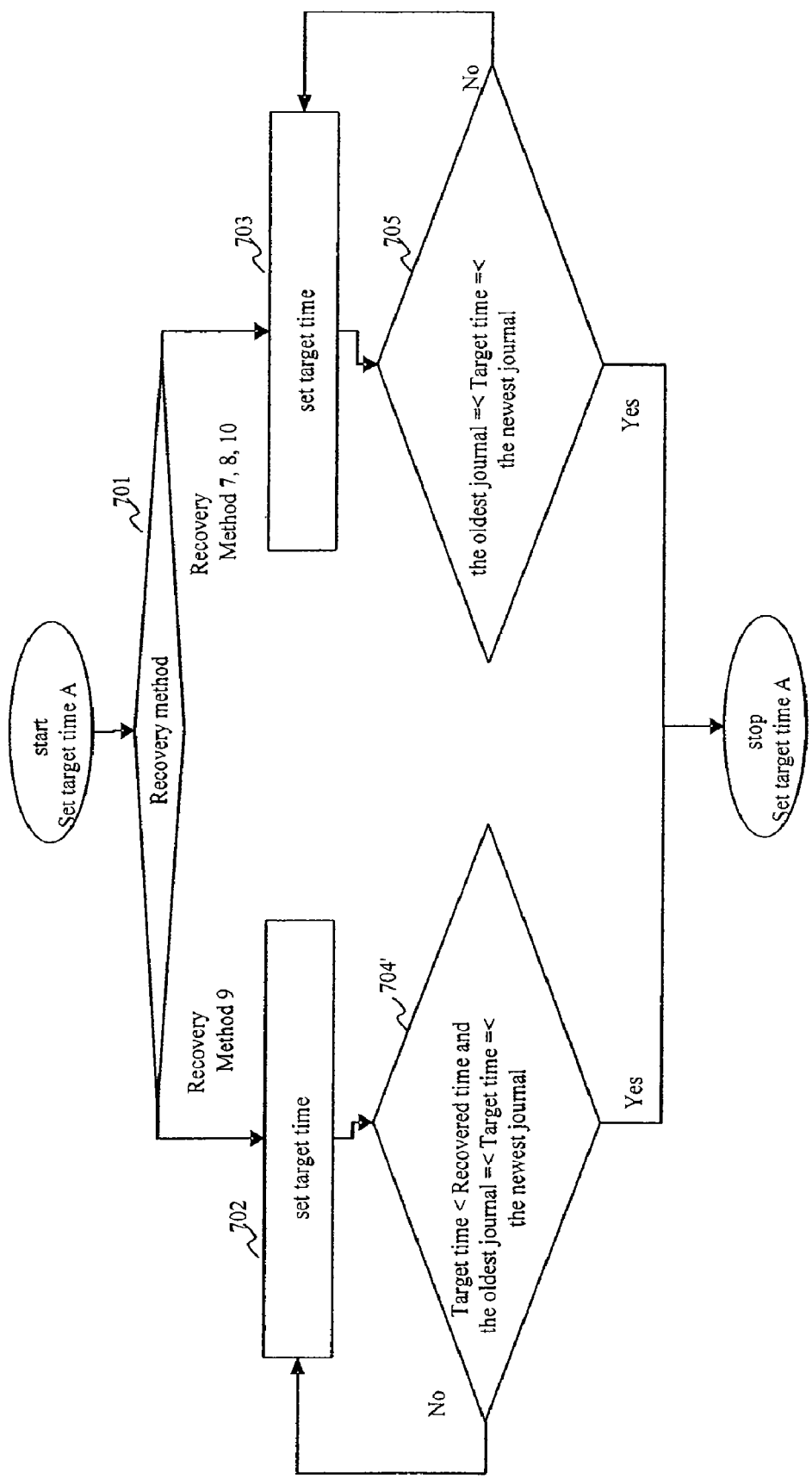
Fig. 7A Setting target time A

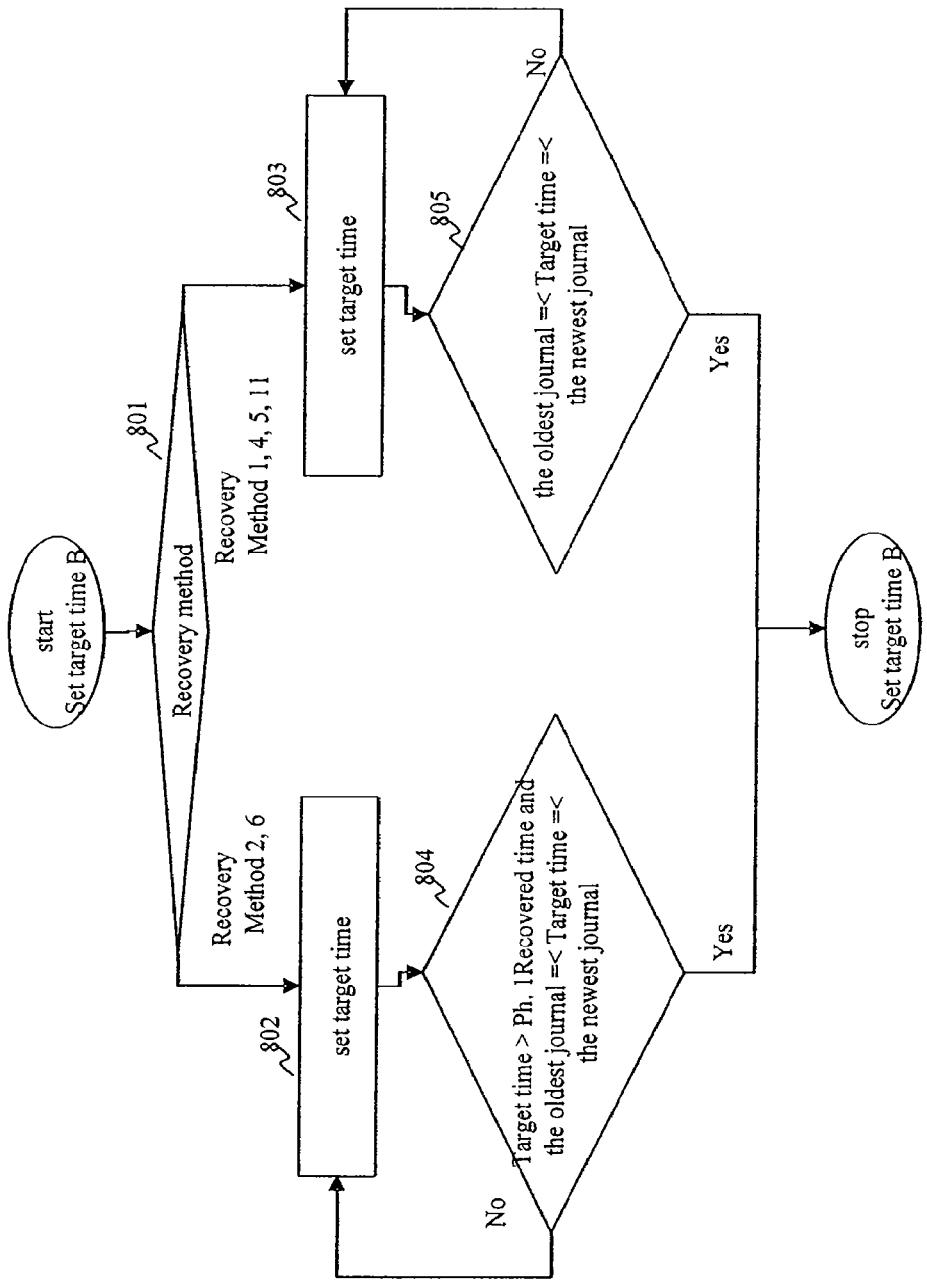
Fig. 8 Setting target time B

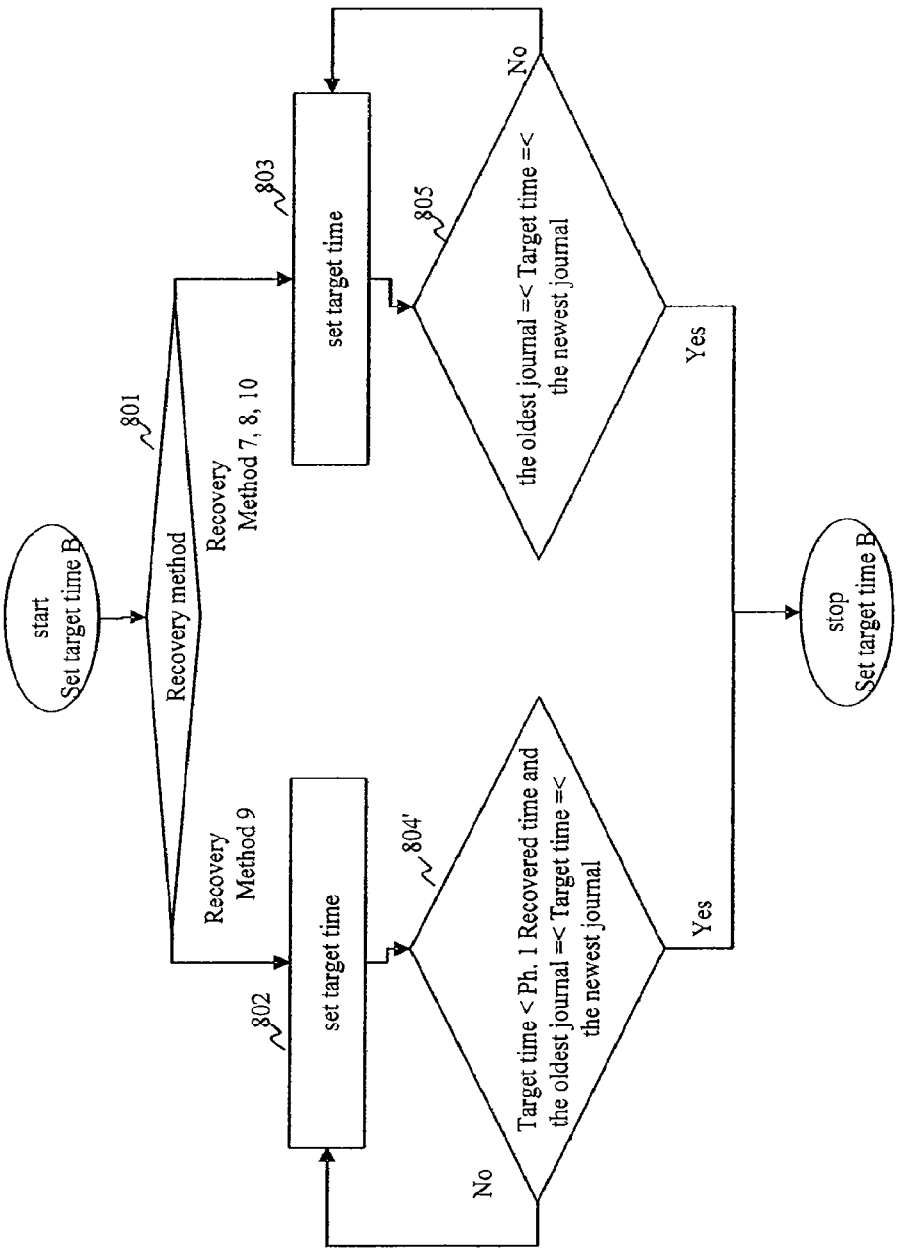
Fig. 8A Setting target time B

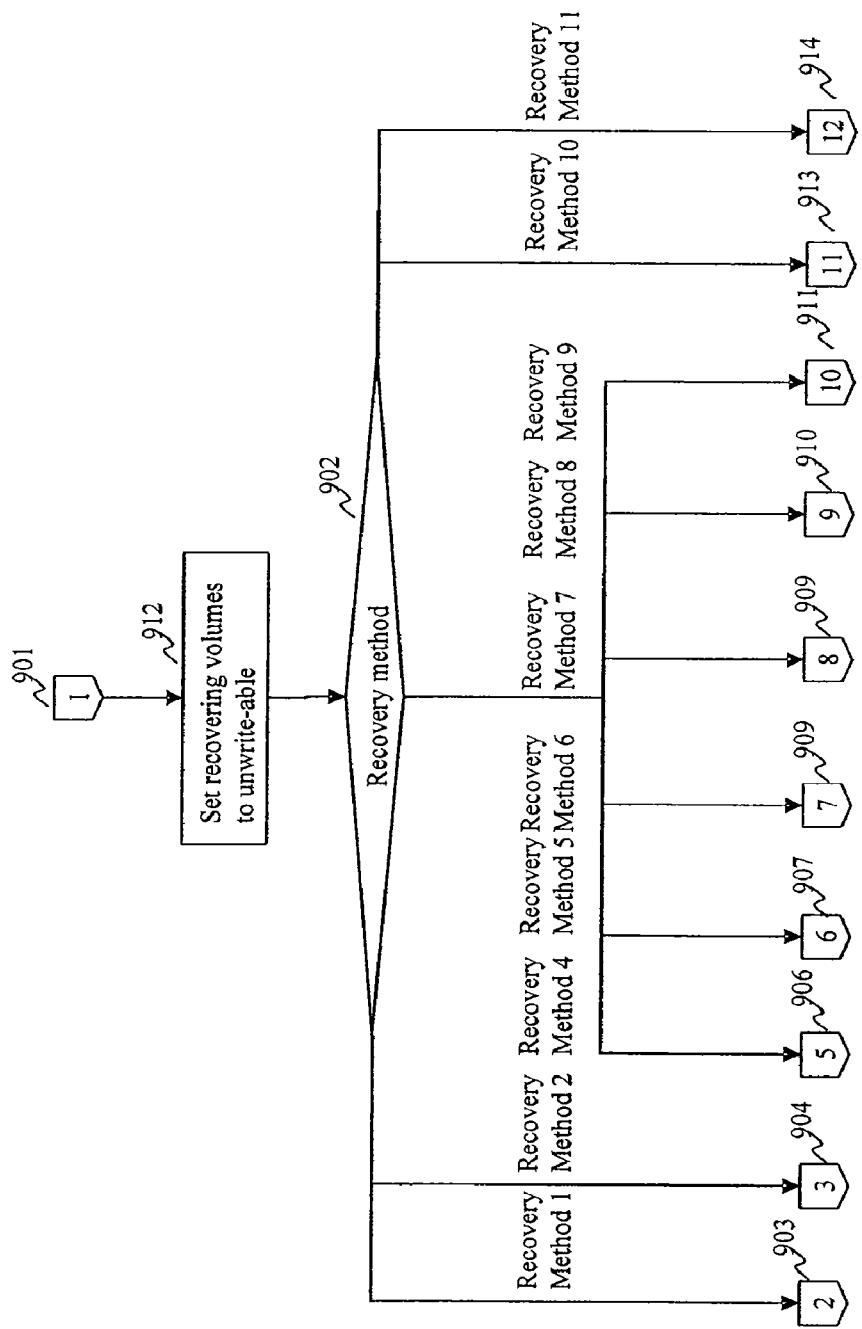
Fig. 9 Executing recovery

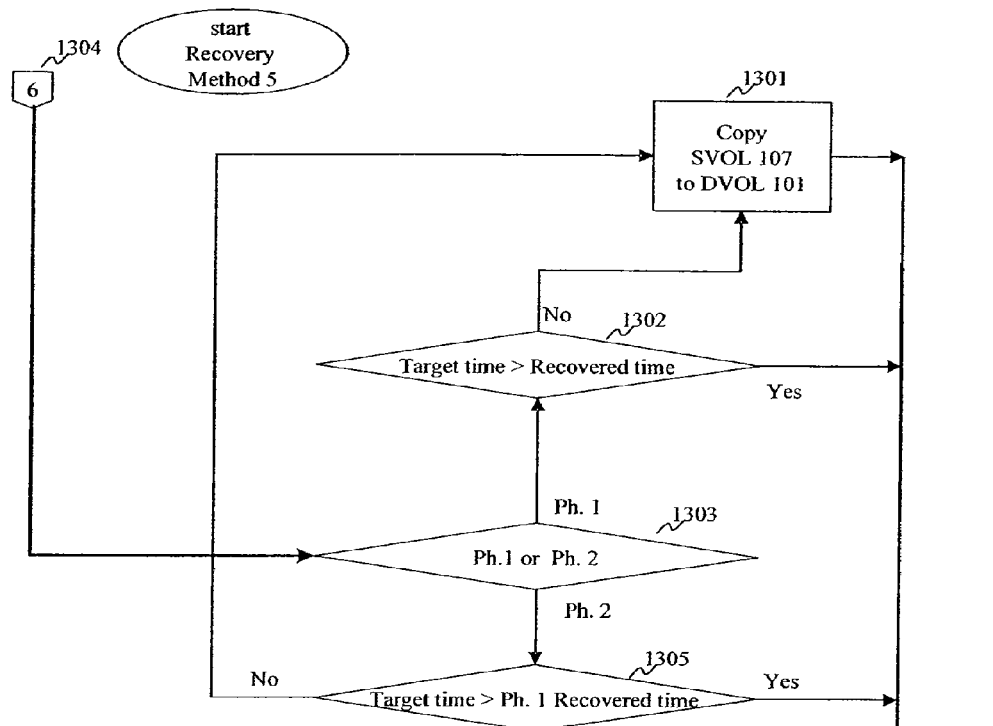
Fig. 13
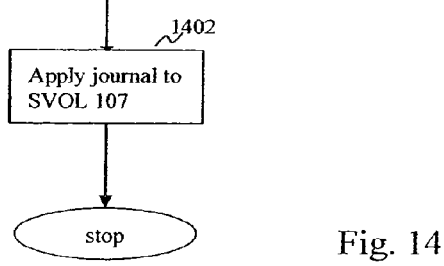
Fig. 14

| Q1 | Q2 | | Q3 | Q4 | Recovery method |
|---|---|---|---|---|---|
| After Journal | File | | Re-recover | Original DVOL | Method 11, 11' |
| | | | | No Original DVOL | Method 4, 4' |
| | | | Can Not Re-recover | Original DVOL | Method 2 |
| | | | | No Original DVOL | Method 6 |
| | VOL | | Re-recover | Original DVOL | Method 1 |
| | | | | No Original DVOL | Method 5 |
| | | | Can Not Re-recover | Original DVOL | Method 2 |
| | | | | No Original DVOL | Method 6 |
| Before Journal | File | | Re-recover | Original DVOL | Method 10 |
| | | | | No Original DVOL | Method 8 |
| | | | Can Not Re-recover | Original DVOL | - |
| | | | | No Original DVOL | - |
| | VOL | | Re-recover | Original DVOL | Method 7 |
| | | | | No Original DVOL | Method 8 |
| | | | Can Not Re-recover | Original DVOL | - |
| | | | | No Original DVOL | Method 9 |

Fig. 18 Recovery Method

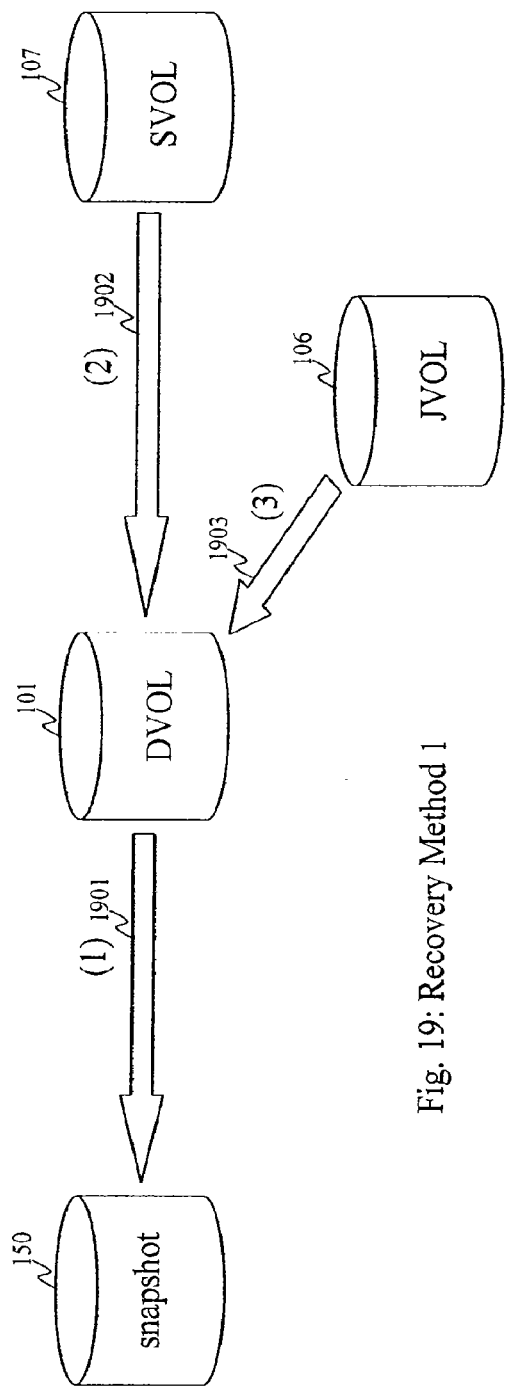
Fig. 19: Recovery Method 1
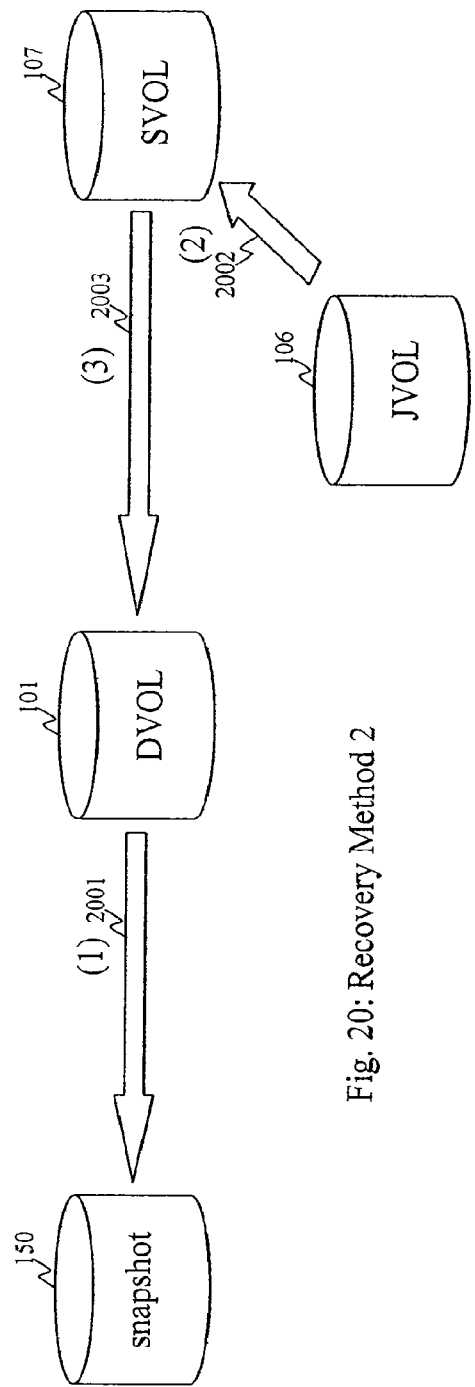
Fig. 20: Recovery Method 2

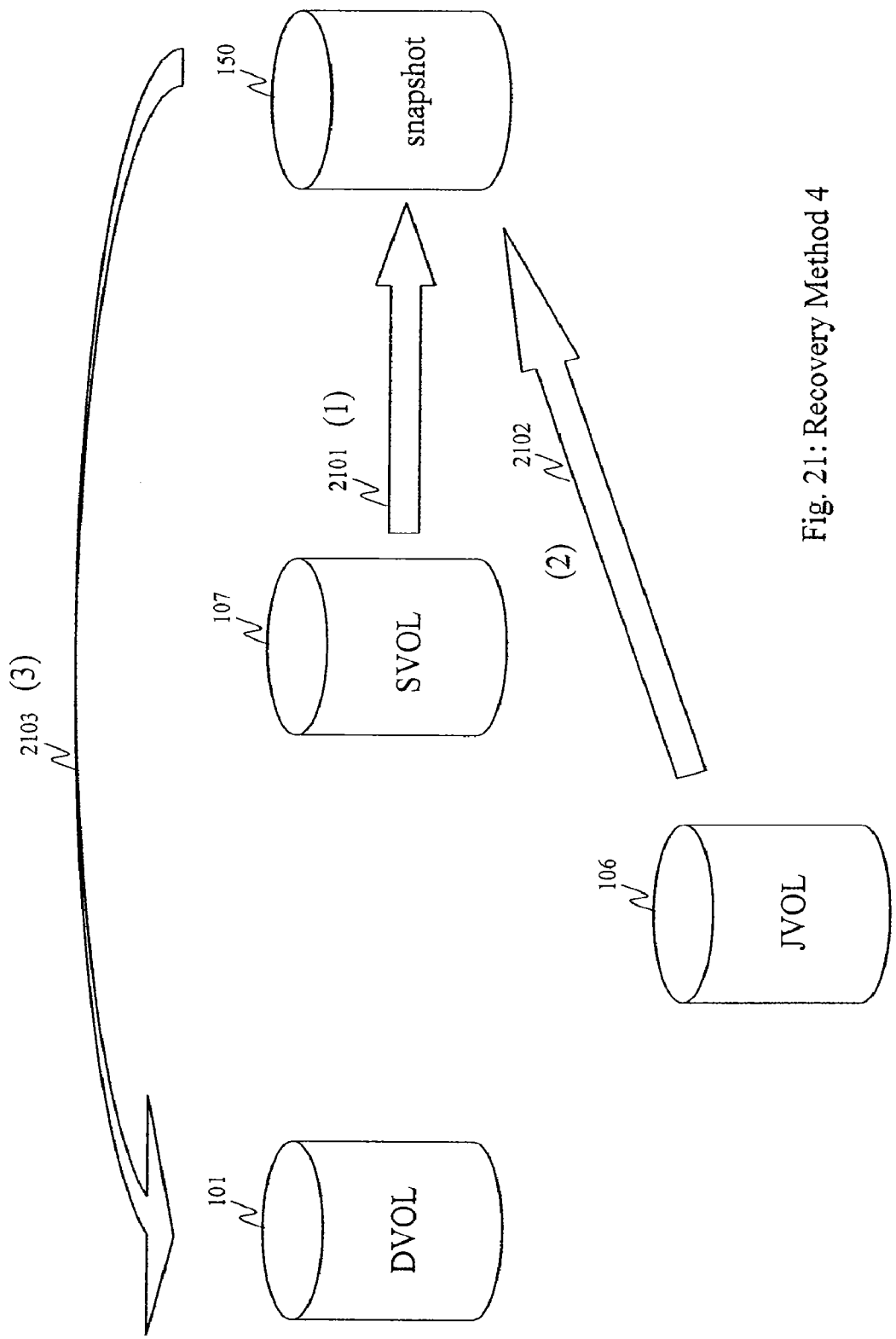
Fig. 21: Recovery Method 4

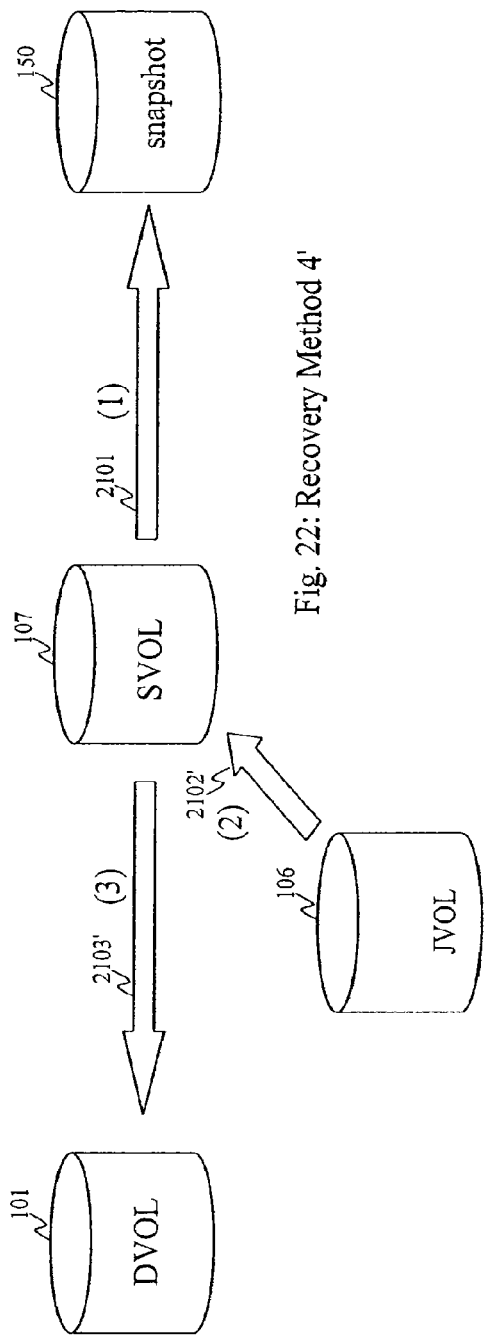
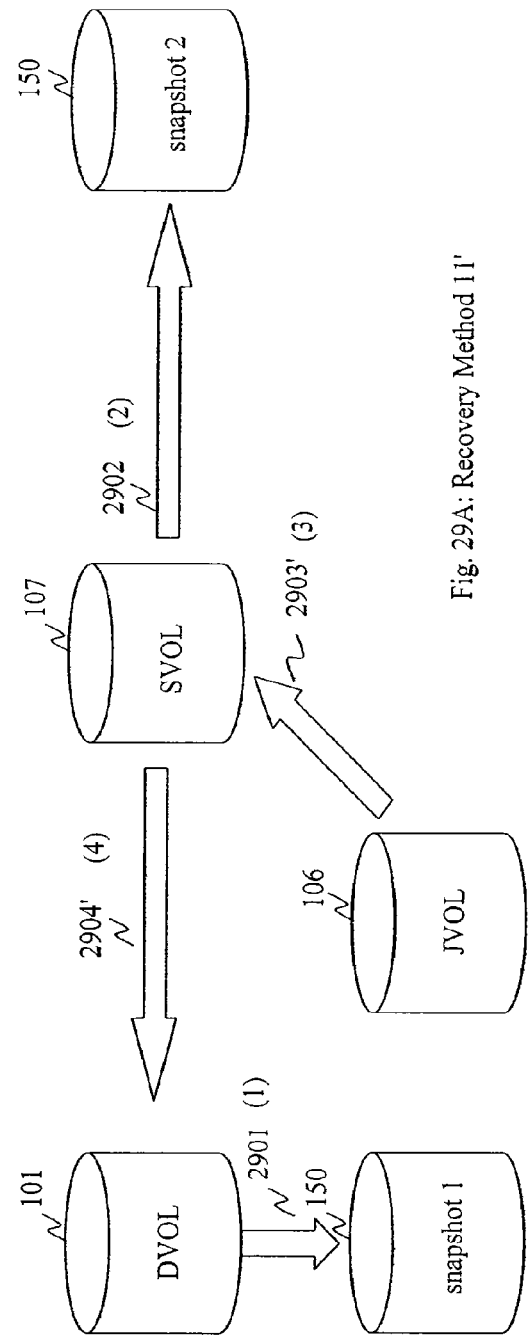

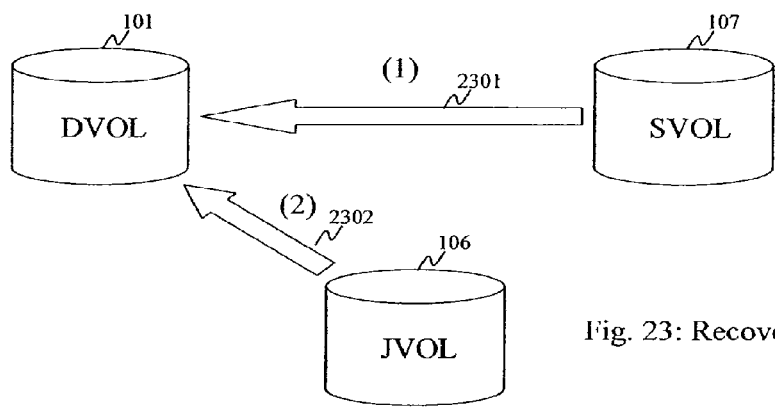
Fig. 23: Recovery Method 5
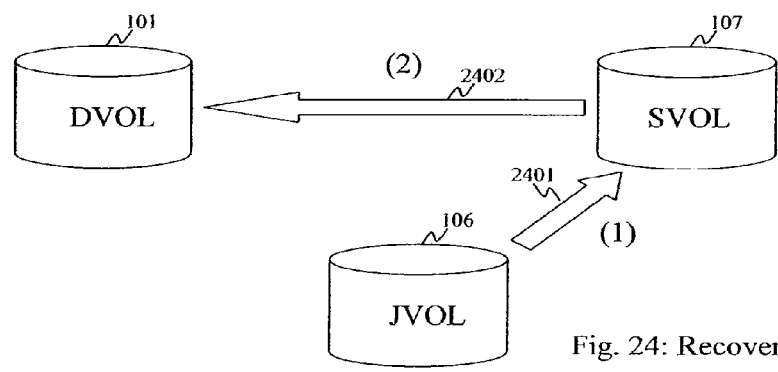
Fig. 24: Recovery Method 6
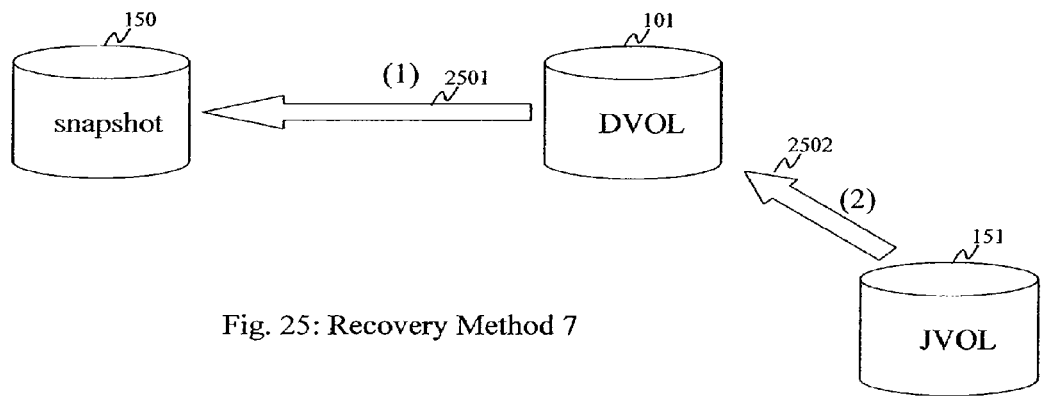
Fig. 25: Recovery Method 7

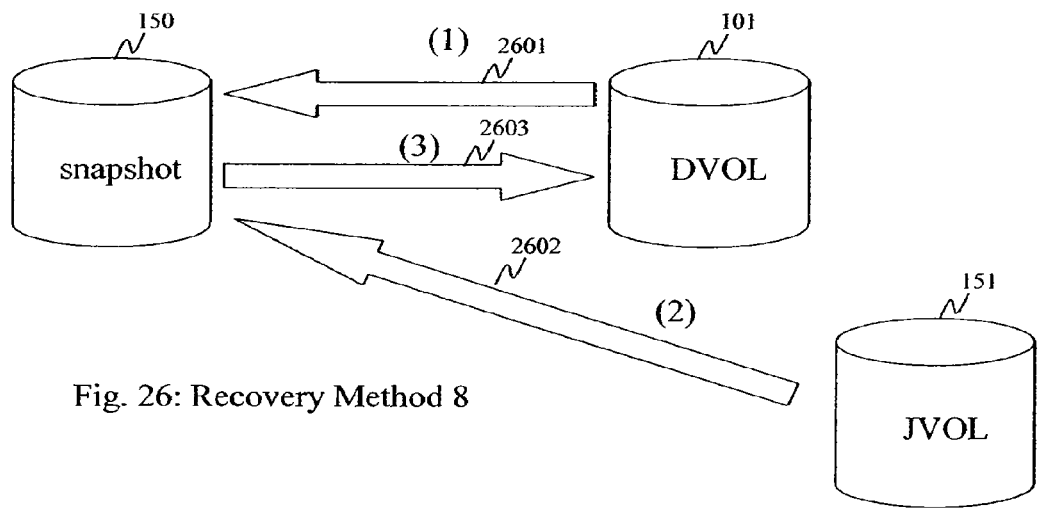
Fig. 26: Recovery Method 8
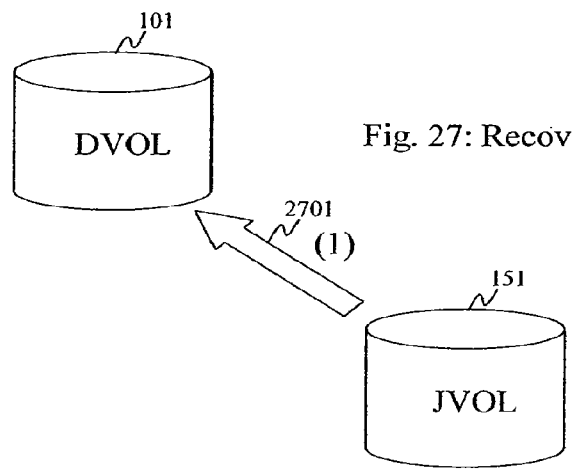
Fig. 27: Recovery Method 9
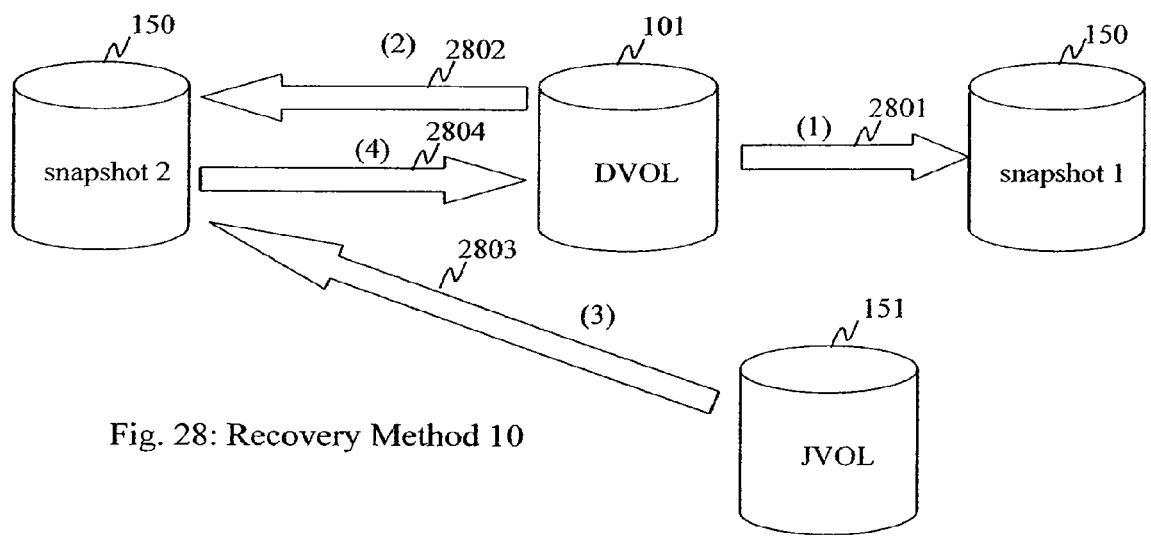
Fig. 28: Recovery Method 10

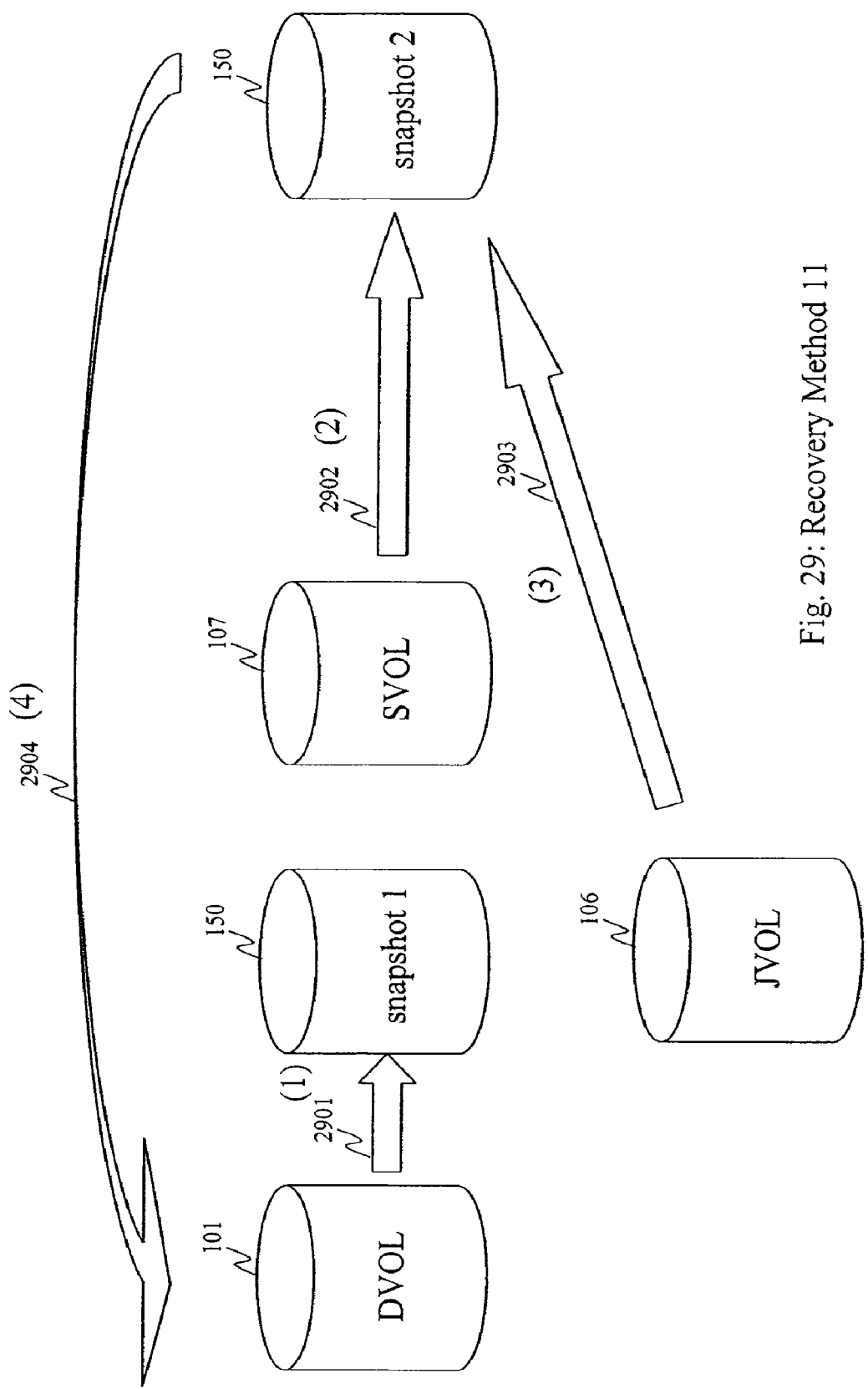
Fig. 29: Recovery Method 11

| | | Journal Group ID 3901 | | |
|---|---|---|---|---|
| | | 1 | 2 | 3 |
| time | Target time 3902 | 10/3/2004 18:00:00 | - | - |
| | Recovered Time 3903 | 10/3/2004 17:50:00 | - | - |
| | Time of the oldest journal 3904 | 09/27/2004 08:12:00 | - | - |
| | Time of the newest journal 3905 | 10/3/2004 21:07:00 | - | - |
| | phase I recovery time 3906 | 10/3/2004 17:00:00 | - | - |

Fig. 39 Recovery table

METHOD AND APPARATUS FOR DATA RECOVERY SYSTEM USING STORAGE BASED JOURNALING

CROSS-REFERENCES TO RELATED APPLICATIONS

This application is a continuation application of U.S. patent application Ser. No. 12/143,419, filed Jun. 20, 2008, which is herein incorporated by reference for all purposes.

This application is a continuation application of U.S. patent application Ser. No. 10/931,543, filed Aug. 31, 2004 and is herein incorporated by reference for all purposes.

This application is a continuation-in-part of U.S. patent application Ser. No. 10/608,391, Filed Jun. 26, 2003 and is herein incorporated by reference for all purposes.

This application is a continuation-in-part application of U.S. patent application Ser. No. 10/621,791, filed Jul. 16, 2003 and is herein incorporated by reference for all purposes.

This application is related to the following commonly owned and co-pending U.S. applications: U.S. patent application Ser. No. 10/627,507, filed Jul. 25, 2003 U.S. patent application Ser. No. 10/823,619, filed Apr. 14, 2004 and titled all of which are herein incorporated by reference for all purposes.

BACKGROUND OF THE INVENTION

The present invention is related to computer storage and in particular to the recovery of data.

Several methods are conventionally used to prevent the loss of data. Typically, data is backed up in a periodic manner (e.g., once a day) by a system administrator. Many systems are commercially available which provide backup and recovery of data; e.g., Veritas NetBackup, Legato/Networker, and so on. Another technique is known as volume shadowing. This technique produces a mirror image of data onto a secondary storage system as it is being written to the primary storage system.

Journaling is a backup and restore technique commonly used in database systems. An image of the data to be backed up is taken. Then, as changes are made to the data, a journal of the changes is maintained. Recovery of data is accomplished by applying the journal to an appropriate image to recover data at any point in time. Typical database systems, such as Oracle, can perform journaling.

Except for database systems, however, there are no ways to recover data at any point in time. Even for database systems, applying a journal takes time since the procedure includes:
  reading the journal data from storage (e.g., disk)
  the journal must be analyzed to determine at where in the journal the desired data can be found
  apply the journal data to a suitable image of the data to reproduce the activities performed on the data—this usually involves accessing the image, and writing out data as the journal is applied Also, if an application running on the database system interacts with another application (regardless of whether it is a database system or not), then there is no way to recover its data at any point in time. This is because there is no coordination mechanism to recover the data of the other application.

Recovering data at any point in time addresses the following types of administrative requirements. For example, a typical request might be, "I deleted a file by mistake at around 10:00 am yesterday. I have to recover the file just before it was deleted."

If the data is not in a database system, this kind of request cannot be conveniently, if at all, serviced. A need therefore exists for processing data in a manner that facilitates recovery of lost data. A need exists for being able to provide data processing that facilitates data recovery in user environments other than in a database application, or database application interacting with other applications.

SUMMARY OF THE INVENTION

The invention is directed to method and apparatus for data recovery in a storage system. Snapshots and journal entries are recorded during normal access to the production volume by applications running on a host machine. Snapshots and journal entries are created during recovery. Journal entries include BEFORE journals and AFTER journals. Snapshots can be saved during the recovery process to allow for repeated recovery attempts.

BRIEF DESCRIPTION OF THE DRAWINGS

Aspects, advantages and novel features of the present invention will become apparent from the following description of the invention presented in conjunction with the accompanying drawings:

FIG. 5 highlights the process flow for a recovery operation of an AFTER journal;

FIG. 5A highlights the process flow for a recovery operation of a BEFORE journal;

FIG. 6 highlights the process flow for phase I processing;

FIG. 7 shows the setting of target time A for an AFTER journal;

FIG. 7A shows the setting of target time A for a BEFORE journal;

FIG. 8 shows the setting of target time B for an AFTER journal;

FIG. 8A shows the setting of target time B for a BEFORE journal;

FIG. 9 shows preprocessing for executing recovery;

FIGS. 12-17 highlight the process flows for recovery methods 4-9, respectively;

FIG. 18 shows a chart of the various recovery methods according to the present invention;

FIG. 19 highlights the data flow for recovery method 1;

FIG. 20 highlights the data flow for recovery method 2;

FIGS. 21-29 highlight the data flows for recovery methods 4-11, respectively;

FIG. 29A highlights the data flow for recovery method 11', an alternate to method 11;

FIG. 39 shows information used for performing a recovery operation.

DESCRIPTION OF THE SPECIFIC EMBODIMENTS

Figure 1:
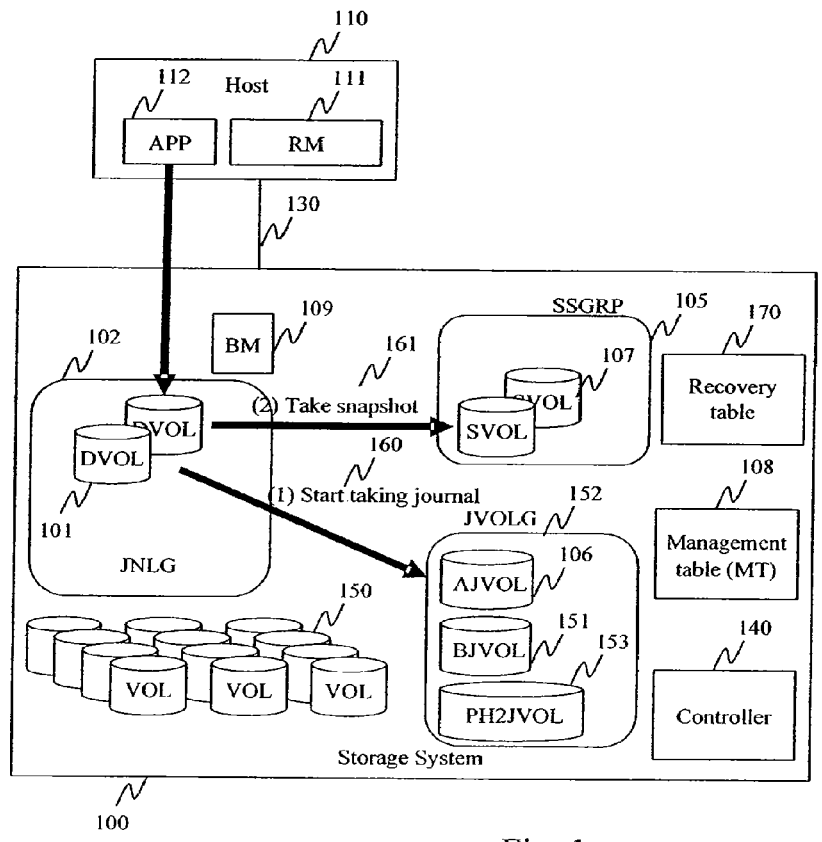
FIG. 1 is a highly generalized block diagram of an illustrative embodiment of a storage system according to the present invention.

FIG. 1 is a high level generalized block diagram of an illustrative embodiment of a backup and recovery system according to the present invention. When the system is activated, a snapshot is taken for production data volumes (DVOL) 101. The term "snapshot" in this context will refer to a data image of the data volume at a given point in time. Depending on system requirements, implementation, and so on, the snapshot can be of the entire data volume, or some portion or portions of the data volume(s); e.g., file system(s), file(s), directory(ies), etc. During the normal course of operation of the system in accordance with the invention, a journal entry is made for every write operation issued from the host to the data volumes. As will be discussed below, by applying a series of journal entries to an appropriate snapshot, data can be recovered at any point in time.

The backup and recovery system shown in FIG. 1 includes at least one storage system 100. Though not shown, one of ordinary skill can appreciate that the storage system includes suitable processor(s), memory, and control circuitry to perform 10 between a host 110 and its storage media (e.g., disks). The backup and recovery system also requires at least one host 110. A suitable communication path 130 is provided between the host and the storage system; e.g., a Fibre Channel (FC) connection. If the RM 111 is provided in the storage system 100, Ethernet can be used with the FC to control the RM 111 from a web browser miming on the host 110.

The host 110 typically will have one or more user applications (APP) 112 executing on it. These applications will read and/or write data to storage media contained in the data volumes 101 of storage system 100. Thus, applications 112 and the data volumes 101 represent the target resources to be protected. It can be appreciated that data used by the user applications can be stored in one or more data volumes.

In accordance with the invention, a journal group (JNLG) 102 is defined. The data volumes 101 are organized into (or otherwise associated with) a journal group 102. In accordance with the present invention, a journal group is the smallest unit of data volumes where journaling of the write operations from the host 110 to the data volumes is guaranteed. The associated journal records the order of write operations from the host to the data volumes in proper sequence. The journal data produced by the journaling activity can be stored in a journal volume more particularly referred to as an AFTER journal volume (AJVOL) 106. Journal data can also be stored in a journal volume referred to as a BEFORE journal volume (BJVOL) 151. A third type of journal volume is also maintained, referred to as a Phase 2 journal volume (PH2JVOL) 153. The Phase 2 journal volume is used for un-doable recovery mode, as will be discussed in further detail below, and includes AFTER and BEFORE journals. These volumes typically comprise one or more physical storage devices, and are not necessarily single volumes as schematically indicated in the figure. The use of these journal volumes will be discussed further below. These volumes together constitute what is referred to as a journal volume group (JVOLG) 152.

The host 110 further includes a recovery manager (RM) 111. This component provides a high level coordination of the backup and recovery operations. Additional discussion about the recovery manager will be discussed below.

The storage system 100 includes a snapshot group (SSGRP) 105 of the data volumes 101 that comprise the journal group 102. A snapshot is representative of the data volumes 101 in the journal group 102 at a point in time that the snapshot was taken. Conventional methods are known for producing the snapshot image. One or more snapshot volumes (SVOL) 107 are provided in the storage system which contain the snapshot data. A snapshot can be contained in one or more snapshot volumes. Though the disclosed embodiment illustrates separate storage components for the journal data and the snapshot data, it can be appreciated that other implementations can provide a single storage component for storing the journal data and the snapshot data.

Figure 3:
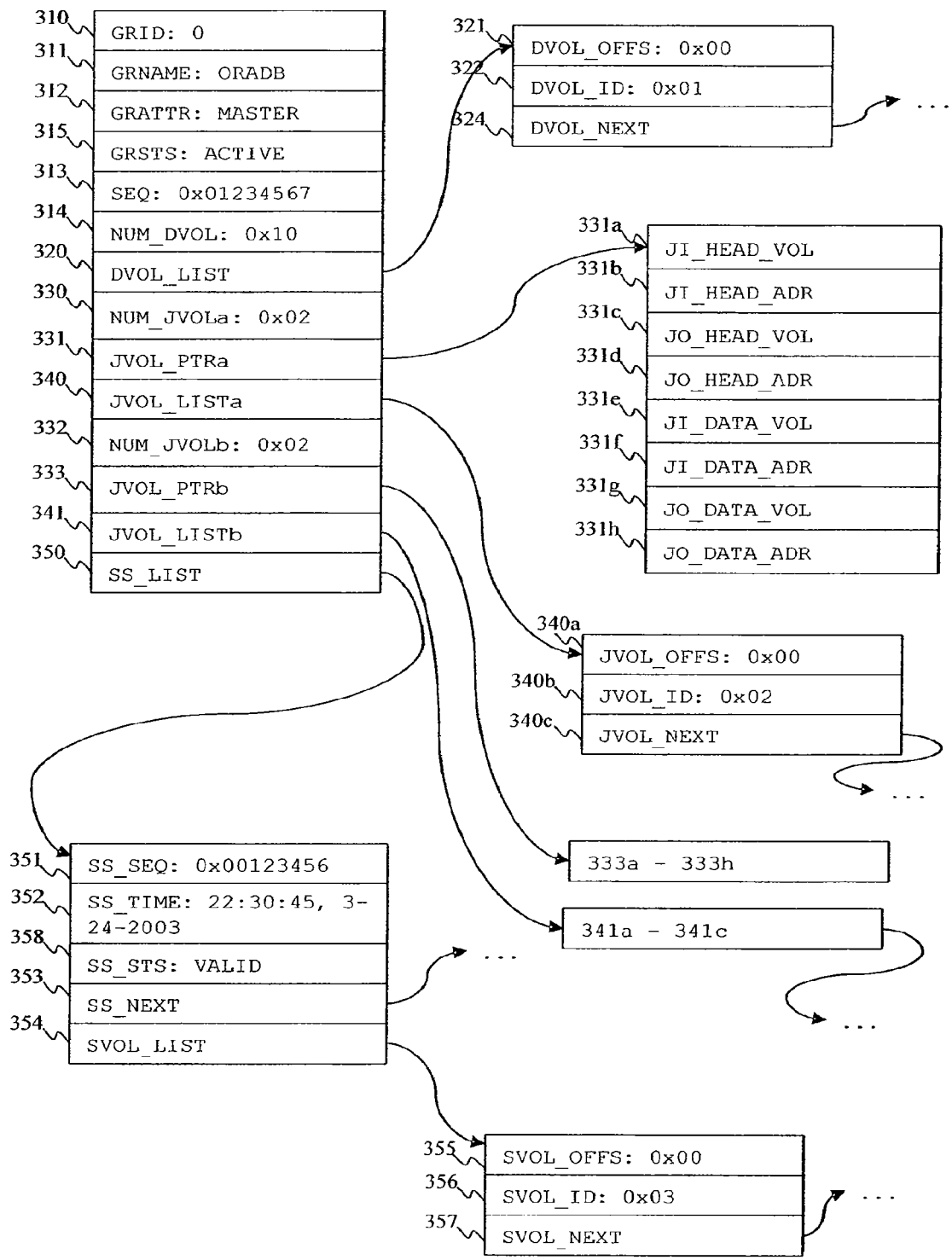
FIG. 3 is a generalized illustration of a management table.

A management table (MT) 108 is provided to store the information relating to the journal group 102, the snapshot group 105, and the journal volume 106. FIG. 3 and the accompanying discussion below reveal additional detail about the management table.

A bitmap 109 is provided to manage the snapshot operation. Each bit corresponds to a data block (e.g., 4 KB in size) in the DVOL 101. When a block in the DVOL 101 is copied to a snapshot, the corresponding bit is cleared (or set). When a data block is written by the application 112, its corresponding bit is set (or cleared). One such bitmap is associated with each DVOL 101.

A recovery table 1790 is used during the recovery operation.

A controller component 140 is also provided which coordinates the journaling of write operations and snapshots of the data volumes, and the corresponding movement of data among the different storage volumes. It can be appreciated that the controller component is a logical representation of a physical implementation which may comprise one or more sub-components distributed within the storage system 100. As shown in FIG. 1, after journals of DVOL 101 are taken (in a flow 160) and stored to AJVOL 106 for the purpose of backups. A snapshot of DVOL 101 is also taken (in a flow 161) and stored to SVOL 107. This aspect of the system is disclosed in more detail in co-pending U.S. application Ser. No. 10/621,791, filed Jul. 16, 2003. As will be discussed in further detail, an aspect of the present invention is a backup method that includes taking before journals of DVOL 101 (in the flow 160) and storing them to JVOL 151, and taking snapshots of DVOL 101 as necessary and storing them to SVOL 107 (in a flow 161).

Additional storage volumes 150 are shown. As will be discussed, these volumes will be used in various recovery operations according to the present invention and thus can be viewed as a pool of volumes. Generally, they constitute free storage during the recovery operations to store intermediate copies of volumes.

Figure 2:
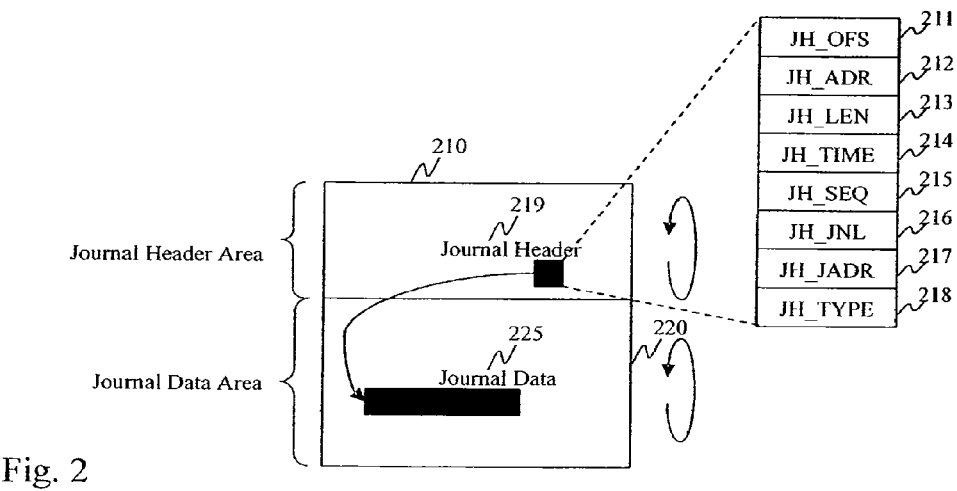
FIG. 2 is a generalized illustration of a illustrative embodiment of a data structure for storing journal entries in accordance with the present invention.

FIG. 2 shows the data used in an implementation of the journal. When a write request from the host 110 arrives at the storage system 100, a journal is generated in response. The journal comprises a Journal Header 219 and Journal Data 225. The Journal Header 219 contains information about its corresponding Journal Data 225. The Journal Data 225 comprises the data (write data) that is the subject of the write operation. This kind of journal is referred to as an "AFTER journal."

The Journal Header 219 comprises an offset number (JH_OFS) 211. The offset number identifies a particular data volume 101 in the journal group 102. In this particular implementation, the data volumes are ordered as the 0th data volume, the 1st data volume, the 2nd data volume and so on. The offset numbers might be 0, 1, 2, etc.

A starting address in the data volume (identified by the offset number 211) to which the write data is to be written is stored to a field in the Journal Header 219 to contain an address (JH_ADR) 212. For example, the address can be represented as a block number (LBA, Logical Block Address).

A field in the Journal Header 219 stores a data length (JH_LEN) 213, which represents the data length of the write data. Typically it is represented as a number of blocks.

A field in the Journal Header 219 stores the write time (JH_TIME) 214, which represents the time when the write request arrives at the storage system 100. The write time can include the calendar date, hours, minutes, seconds and even milliseconds. This time can be provided by the disk controller 140 or by the host 110. For example, in a mainframe computing environment, two or more mainframe hosts share a timer, called the Sysplex Timer, and can provide the time in a write command when it is issued.

A sequence number (JH_SEQ) 215 is assigned to each write request. The sequence number is stored in a field in the Journal Header 219. Every sequence number within a given journal group 102 is unique. The sequence number is assigned to a journal entry when it is created.

A journal volume identifier (JH_JVOL) 216 is also stored in the Journal Header 219. The volume identifier identifies the journal volume 106 associated with the Journal Data 225. The identifier is indicative of the journal volume containing the Journal Data. It is noted that the Journal Data can be stored in a journal volume that is different from the journal volume which contains the Journal Header.

A journal data address (JH_JADR) 217 stored in the Journal Header 219 contains the beginning address of the Journal Data 225 in the associated journal volume 106 that contains the Journal Data.

FIG. 2 shows that the journal volume 106 comprises two data areas: a Journal Header Area 210 and a Journal Data Area 220. The Journal Header Area 210 contains only Journal Headers 219, and Journal Data Area 220 contains only Journal Data 225. The Journal Header is a fixed size data structure. A Journal Header is allocated sequentially from the beginning of the Journal Header Area. This sequential organization corresponds to the chronological order of the journal entries. As will be discussed, data is provided that points to the first journal entry in the list, which represents the "oldest" journal entry. It is typically necessary to find the Journal Header 219 for a given sequence number (as stored in the sequence number field 215) or for a given write time (as stored in the time field 214).

A journal type field (JH_TYPE) 218 identifies the type of journal entry. In accordance with the invention, two types of journal entries are kept: (1) an AFTER journal; (2) a BEFORE journal; (3) a PH2AFTER journal; and (4) a PH2BEFORE journal. An AFTER journal entry contains the data that is contained in the write operation for which a journal entry is made. A BEFORE journal entry contains the original data of the area in storage that is the target of a write operation. A BEFORE journal entry therefore represents the contents "before" the write operation is performed. The purpose of maintaining BEFORE journal entries will be discussed below. A PH2AFTER journal is an AFTER journal entry produced during what will discussed below as phase 2 recovery. A PH2BEFORE journal is a BEFORE journal produced during phase 2 recovery.

Journal Header 219 and Journal Data 225 are contained in chronological order in their respective areas in the journal volume 106. Thus, the order in which the Journal Header and the Journal Data are stored in the journal volume is the same order as the assigned sequence number. As will be discussed below, an aspect of the present invention is that the journal information 219, 225 wrap within their respective areas 210, 220.

As will be explained below recovery of the production volume(s) 101 can be facilitated by allowing the user to interact with the recovery process. A "fast recovery" can be performed which quickly recovers the data state to a point in time prior to a target time. A more granular recovery procedure can then be performed which allows a user to hone in on the target data state. The user can perform "undo-able recoveries" to inspect the data state in a trial and error manner by allowing the user to step forward and backward (undo operation) in time. This aspect of the invention allows a user to be less specific as to the time of the desired data state. The target time specified by the user need only be a time that he is certain is prior to the time of the target data state. It is understood that "the target data state" can refer to any desired state of the data.

FIG. 3 shows detail about the management table 108 (FIG. 1). In order to manage the Journal Header Area 210 and Journal Data Area 220, pointers for each area are needed. As mentioned above, the management table maintains configuration information about a journal group 102 and the relationship between the journal group and its associated journal volume(s) 106 and snapshot image 105.

The management table 108 shown in FIG. 3 illustrates an example management table and its contents. The management table stores a journal group ID (GRID) 310 which identifies a particular journal group 102 in a storage system 100. A journal group name (GRNAME) 311 can also be provided to identify the journal group with a human recognizable identifier.

A journal attribute (GRATTR) 312 is associated with the journal group 102. In accordance with this particular implementation, two attributes are defined: MASTER and RESTORE. The MASTER attribute indicates the journal group is being journaled. The RESTORE attribute indicates that the journal group is being restored from a journal.

A journal status (GRSTS) 315 is associated with the journal group 102. There are two statuses: ACTIVE and INACTIVE.

The management table includes a field to hold a sequence counter (SEQ) 313. This counter serves as the source of sequence numbers used in the Journal Header 219. When creating a new journal, the sequence number 313 is read and assigned to the new journal. Then, the sequence number is incremented and written back into the management table.

The number (NUM_DVOL) 314 of data volumes 101 contained in a give journal group 102 is stored in the management table.

A data volume list (DVOL_LIST) 320 lists the data volumes in a journal group. In a particular implementation, DVOL_LIST is a pointer to the first entry of a data structure which holds the data volume information. This can be seen in FIG. 3. Each data volume information comprises an offset number (DVOL_OFFS) 321. For example, if the journal group 102 comprises three data volumes, the offset values could be 0, 1 and 2. A data volume identifier (DVOL_ID) 322 uniquely identifies a data volume within the entire storage system 100. A pointer (DVOL_NEXT) 324 points to the data structure holding information for the next data volume in the journal group; it is a NULL value otherwise.

The management table includes two sets of fields, one set of fields (330, 331, 340) for managing AFTER journal entries and another set of fields (332, 333, 341) for managing BEFORE journal entries.

The fields related to the AFTER journal entries include a field to store the number of journal volumes (NUM_JVOLa) 330 that are used to contain the data (journal header and journal data) associated with the AFTER journal entries for a journal group 102.

As described in FIG. 2, the Journal Header Area 210 contains the Journal Headers 219 for each journal; likewise for the Journal Data components 225. As mentioned above, an aspect of the invention is that the data areas 210, 220 wrap. This allows for journaling to continue despite the fact that there is limited space in each data area.

The management table includes fields to store pointers to different parts of the data areas 210, 220 to facilitate wrapping. Pointer-type information is provided to facilitate identifying where the next journal entry is to be stored. A set of such information ("AFTER journal pointers") is provided for the AFTER journal entries. A field (JVOL_PTRa) 331 in the management table identifies the location of the AFTER journal pointers 331a to 331h.

The AFTER journal entries are stored in one or more journal volumes (AJVOL, 106), separate from the BEFORE journal entries. A field (JI_HEAD_VOL) 331a identifies the journal volume 106 that contains the Journal Header Area 210 from which the next Journal Header 219 will be obtained. A field (JI_HEAD_ADR) 331b identifies where in the in Journal Header Area the next Journal Header is located. The journal volume that contains the Journal Data Area 220 into which the journal data will be stored is identified by information in a field (JI_DATA_VOL) 331e. A field (JI_DATA_ADR) 331f identifies the specific address in the Journal Data Area where the data will be stored. Thus, the next AFTER journal entry to be written is "pointed" to by the information contained in the "JI_" fields 331a, 331b, 331e, 331f.

The AFTER journal pointers 331a to 331h also include fields which identify the "oldest" AFTER journal entry. The use of this information will be described below. A field (JO_HEAD_VOL) 331c identifies the journal volume which stores the Journal Header Area 210 that contains the oldest Journal Header 219. A field (JO_HEAD_ADR) 331d identifies the address within the Journal Header Area of the location of the journal header of the oldest journal. A field (JO_DATA_VOL) 331g identifies the journal volume which stores the Journal Data Area 220 that contains the data of the oldest journal. The location of the data in the Journal Data Area is stored in a field (JO_DATA_ADR) 331h.

The management table 108 includes a pointer (JVOL_LISTa) 340 to a list of journal volumes associated with the AFTER journal entries of a journal group 102. In a particular implementation, JVOL_LISTa is a pointer to a data structure of information for journal volumes. As can be seen in FIG. 3, each data structure comprises an offset number (JVOL_OFS) 340a which identifies a particular journal volume 106 associated with a given journal group 102. For example, if a journal group is associated with two journal volumes 106, then each journal volume might be identified by a 0 or a 1. A journal volume identifier (JVOL_ID) 340b uniquely identifies the journal volume within the storage system 100. Finally, a pointer (JVOL_NEXT) 340c points to the next data structure entry pertaining to the next journal volume associated with the journal group; it is a NULL value otherwise.

The management table 108 also includes a set of similar fields for managing the BEFORE journal entries. The fields related to the BEFORE journal entries include a field to store the number of journal volumes (NUM_JVOLb) 332 that are being used to contain the data (journal header and journal data) associated with the BEFORE journal entries for a journal group 102.

As discussed above for the AFTER journal entries, an aspect of the invention is that the data areas 210, 220 wrap. The management table includes fields to store pointers to different parts of the data areas 210, 220 to facilitate wrapping. Pointer-type information is provided to facilitate identifying where the next BEFORE journal entry is to be stored. A set of such information ("BEFORE journal pointers") is provided for the BEFORE journal entries. A field (JVOL_PTRb) 333 in the management table identifies the location of the BEFORE journal pointers 333a to 333h.

The BEFORE journal entries are stored in one or more journal volumes (BJVOL, 151), separate from the journal volume(s) used to store the AFTER journal entries. A field (JI_HEAD_VOL) 333a identifies the journal volume 151 that contains the Journal Header Area 210 from which the next Journal Header 219 will be obtained. A field (JI_HEAD_ADR) 333b identifies where in the in Journal Header Area the next Journal Header is located. The journal volume that contains the Journal Data Area 220 into which the journal data will be stored is identified by information in a field (JI_DATA_VOL) 333e. A field (JI_DATA_ADR) 333f identifies the specific address in the Journal Data Area where the data will be stored. Thus, the next BEFORE journal entry to be written is "pointed" to by the information contained in the "JI_" fields 333a, 333b, 333e, 333f.

The BEFORE journal pointers also includes fields which identify the "oldest" BEFORE journal entry. The use of this information will be described below. A field (JO_HEAD_VOL) 333c identifies the journal volume which stores the Journal Header Area 210 that contains the oldest Journal Header 219. A field (JO_HEAD_ADR) 333d identifies the address within the Journal Header Area of the location of the journal header of the oldest journal. A field (JO_DATA_VOL) 333g identifies the journal volume which stores the Journal Data Area 220 that contains the data of the oldest journal. The location of the data in the Journal Data Area is stored in a field (JO_DATA_ADR) 333h.

The management table 108 includes a list of journal volumes (JVOL_LISTb) 341 associated with the BEFORE journal entries of a journal group 102. In a particular implementation, JVOL_LISTb is a pointer to a data structure of information for journal volumes. As can be seen in FIG. 3, each data structure comprises an offset number (JVOL_OFS) 341a which identifies a particular journal volume 151 associated with a given journal group 102. A journal volume identifier (JVOL_ID) 341b uniquely identifies the journal volume within the storage system 100. Finally, a pointer (JVOL_NEXT) 341c points to the next data structure entry pertaining to the next journal volume associated with the journal group; it is a NULL value otherwise.

The management table includes a list (SS_LIST) 350 of snapshot images 105 associated with a given journal group 102. In this particular implementation, SS_LIST is a pointer to snapshot information data structures, as indicated in FIG. 3. Each snapshot information data structure includes a sequence number (SS_SEQ) 351 that is assigned when the snapshot is taken. As discussed above, the number comes from the sequence counter 313. A time value (SS_TIME) 352 indicates the time when the snapshot was taken. A status (SS_STS) 358 is associated with each snapshot; valid values include VALID and INVALID. A pointer (SS_NEXT) 353 points to the next snapshot information data structure; it is a NULL value otherwise.

Each snapshot information data structure also includes a list of snapshot volumes 107 (FIG. 1) used to store the snapshot images 105. As can be seen in FIG. 3, a pointer (SVOL_LIST) 354 to a snapshot volume information data structure is stored in each snapshot information data structure. Each snapshot volume information data structure includes an offset number (SVOL_OFFS) 355 which identifies a snapshot volume that contains at least a portion of the snapshot image. It is possible that a snapshot image will be segmented or otherwise partitioned and stored in more than one snapshot volume. In this particular implementation, the offset identifies the $i^{th}$ snapshot volume which contains a portion (segment, partition, etc) of the snapshot image. In one implementation, the $i^{th}$ segment of the snapshot image might be stored in the $i^{th}$ snapshot volume. Each snapshot volume information data structure further includes a snapshot volume identifier (SVOL_ID) 356 that uniquely identifies the snapshot volume in the storage system 100. A pointer (SVOL_NEXT) 357 points to the next snapshot volume information data structure for a given snapshot image.

Figure 4:
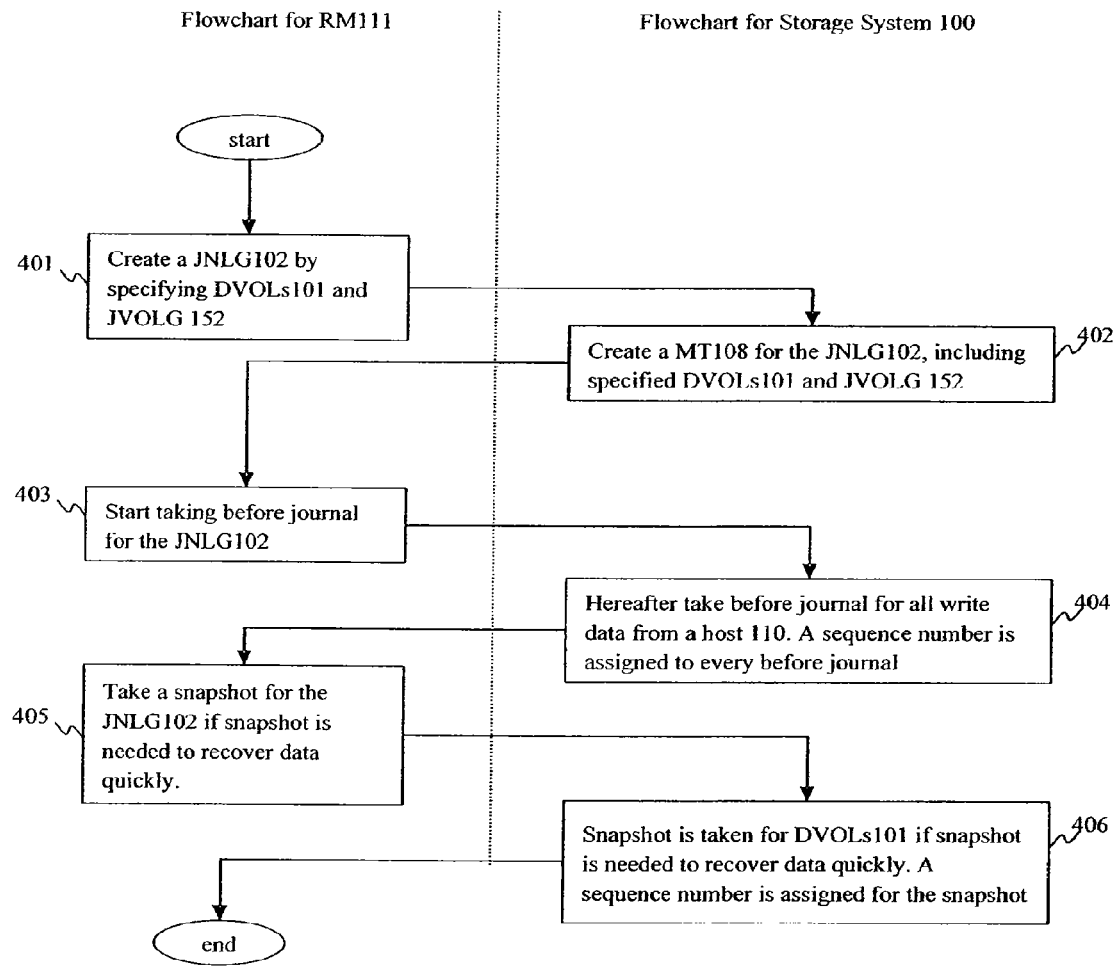
FIG. 4 is a high level flow diagram highlighting the processing between the recovery manager and the controller in the storage system.

FIG. 4 shows a flowchart highlighting the processing performed by the recovery manager 111 and Storage System 100 to initiate backup processing in accordance with the illustrative embodiment of the invention as shown in the figures. If journal entries are not recorded during the taking of a snapshot, the write operations corresponding to those journal entries would be lost and data corruption could occur during a data restoration operation. Thus, in accordance with an aspect of the invention, the journaling process is started prior to taking the first snapshot. Doing this ensures that any write operations which occur during the taking of a snapshot are journaled. As a note, any journal entries recorded prior to the completion of the snapshot can be ignored.

Further in accordance with the invention, a single sequence of numbers (SEQ) 313 are associated with each of one or more snapshots and journal entries, as they are created. The purpose of associating the same sequence of numbers to both the snapshots and the journal entries will be discussed below.

Continuing with FIG. 4, the recovery manager 111 might define, in a step 401, a journal group (JNLG) 102 if one has not already been defined. As indicated in FIG. 1, this may include identifying one or data volumes (DVOL) 101 for which journaling is performed, and identifying a journal volume group (JVOLG) 152 to store the journal-related information. The recovery manager performs a suitable sequence of interactions with the storage system 100 to accomplish this.

In a step 402, the storage system may create a management table 108 (FIG. 1), incorporating the various information shown in the table detail illustrated in FIG. 3. Among other things, the process includes initializing the JVOL_LIST 340 to list the journal volumes which comprise the journal group 102. Likewise, the list of data volumes DVOL_LIST 320 is created. The fields which identify the next journal entry (or in this case where the table is first created, the first journal entry) are initialized. Thus, JI_HEAD_VOL 331 might identify the first in the list of journal volumes and JI_HEAD_ADR 332 might point to the first entry in the Journal Header Area 210 located in the first journal volume. Likewise, JI_DATA_VOL 335 might identify the first in the list of journal volumes and JI_DATA_ADR 336 might point to the beginning of the Journal Data Area 220 in the first journal volume. Note, that the header and the data areas 210, 220 may reside on different journal volumes, so JI_DATA_VOL might identify a journal volume different from the first journal volume.

In a step 403, the recovery manager 111 will initiate the journaling process to collect BEFORE journals. Suitable communication(s) are made to the storage system 100 to perform journaling. In a step 404, the storage system will make a BEFORE journal entry for each write operation that issues from the host 110. A sequence number is assigned to each BEFORE journal that is taken.

With reference to FIG. 3, making a BEFORE journal entry includes, among other things, identifying the location for the next journal entry. The fields JI_HEAD_VOL 333a and JI_HEAD_ADR 333b identify the BEFORE journal volume 151 and the location in the Journal Header Area 210 of the next Journal Header 219. The sequence counter (SEQ) 313 from the management table 108 is copied to (or otherwise associated with) the JH_SEQ 215 field of the next header. The sequence counter is then incremented and stored back to the management table. Of course, the sequence counter can be incremented first, copied to JH_SEQ, and then stored back to the management table.

The fields JI_DATA_VOL 333e and in the management table 108 identify the BEFORE journal volume and the beginning of the Journal Data Area 220 for storing the data associated with the write operation. The JI_DATA_VOL and JI_DATA_ADR fields are copied to JH_JVOL 216 and to JH_ADR 212, respectively, of the Journal Header, thus providing the Journal Header with a pointer to its corresponding Journal Data. The data of the write operation is stored.

The JI_HEAD_VOL 333a and JI_HEAD_ADR 333b fields are updated to point to the next Journal Header 219 for the next journal entry. This involves taking the next contiguous Journal Header entry in the Journal Header Area 210. Likewise, the JI_DATA_ADR field (and perhaps JI_DATA_VOL field) is updated to reflect the beginning of the Journal Data Area for the next journal entry. This involves advancing to the next available location in the Journal Data Area. These fields therefore can be viewed as pointing to a list of journal entries. Journal entries in the list are linked together by virtue of the sequential organization of the Journal Headers 219 in the Journal Header Area 210.

When the end of the Journal Header Area 210 is reached, the Journal Header 219 for the next journal entry wraps to the beginning of the Journal Header Area. Similarly for the Journal Data 225. To prevent overwriting earlier journal entries, the present invention provides for a procedure to free up entries in the journal volume 106. This aspect of the invention is discussed below.

For the very first journal entry, the JO_HEAD_VOL field 333c, JO_HEAD_ADR field 333d, JO_DATA_VOL field 333g, and the JO_DATA ADR field 333f are set to contain their contents of their corresponding "JI_" fields. As will be explained the "JO_" fields point to the oldest journal entry. Thus, as new journal entries are made, the "JO_" fields do not advance while the "JI_" fields do advance. Update of the "JO_" fields is discussed below.

Continuing with the flowchart of FIG. 4, when the journaling process has been initiated, all write operations issuing from the host are journaled. Then in a step 405, the recovery manager 111 will initiate taking a snapshot of the data volumes DVOL 101, if a snapshot is needed for quick data recovery. The storage system 100 receives an indication from the recovery manager to take a snapshot. In a step 406, the storage system performs the process of taking a snapshot of the data volumes. Among other things, this includes accessing SS_LIST 350 from the management table 108 (FIG. 3). A suitable amount of memory is allocated for fields 351-354 to represent the next snapshot. The sequence counter (SEQ) 313 is copied to the field SS_SEQ 351 and incremented, in the manner discussed above for JH_SEQ 215. Thus, over time, a sequence of numbers is produced from SEQ 313, each number in the sequence being assigned either to a journal entry or a snapshot entry. The snapshot is stored in one (or more) snapshot volumes (SVOL) 107. A suitable amount of memory is allocated for fields 355-357. The information relating to the SVOLs for storing the snapshot are then stored into the fields 355-357. If additional volumes are required to store the snapshot, then additional memory is allocated for fields 355-357.

The recover manager 111 provides the following interface to the storage system for the aspect of the invention which provides for "fast" and "undo-able" recovery modes. The interface is shown in a format of an application programmer's interface (API). The functionality and needed information (parameters) are described. It can be appreciated that any suitable programming language can be used.

BACKUP journal_volume method
   This initiates backup processing to commence in the storage system 100. The logging of AFTER journal entries or BEFORE journal entries is initiated for each write operation to the data volumes 101. The parameter journal_volume identifies the journal volume group 102 that contains the journal entries. The parameter method identifies a recovery method that will be used for performing subsequent recovery. Selection of the method determines whether AFTER or BEFORE journal entries are stored. See FIG. 18 for a summary of the recovery methods. An initial snapshot is taken if AFTER journal entries are collected. If BEFORE journal entries are collected, an initial snapshot is not required.

RECOVER_PH1 journal_volume target_time method
   This initiates a PHASE I recovery process. This recovery procedure will be discussed below. Briefly, AFTER journal entries are applied to an appropriate snapshot. The journal entries are contained in the volume(s) identified by journal_volume. The snapshot is first copied from SVOL to DVOL.
   The desired data state is specified by target_time. The target time can be a time format (e.g., year:month:date:hh:mm). Alternatively, the target_time can be a journal sequence number 215, so that journal entries subsequent to the sequence number associated with the snapshot and up to the specified sequence number are applied. Still another alternative is that the target time is simply the number of journal entries to be applied to a snapshot (e.g., apply the next one hundred journal entries). The recovery method is specified in the method parameter; see FIG. 18.

RECOVER_PH2 journal_volume target_time method
   This initiates a PHASE II recovery process. As will be discussed in more detail below, this procedure involves applying AFTER journals in AJVOL 106 to DVOLs 101, and applying BEFORE journals to allow for "un-doing" an update operation on a snapshot. The journal volume group is identified by journal_volume. The desired data state is specified by target_time. The desired data state is specified by target_time. The target time can be a time format (e.g., year:month:date:hh:mm).
   Alternatively, the target_time can be a journal sequence number 215, so that journal entries subsequent to the sequence number associated with the snapshot and up to the specified sequence number are applied. Still another alternative is that the target_time is simply the number of journal entries to be applied to a snapshot (e.g., apply the next one hundred journal entries). The recovery method is specified in the method parameter; see FIG. 18.

STOP_RECOVER
   This will cause the storage system to cease recovery processing. Thus, a PHASE I recovery operation or a PHASE II recovery operation will be terminated. In addition, BEFORE journaling is initiated. This will cause BEFORE journal entries to be made each time the host 110 issues a write operation, in addition to the making an AFTER journal entry.

UNDO_RECOVER journal_volume target_time method
   As will be discussed in more detail below, this operation will revert an updated snapshot to an earlier point in time. This is accomplished by "undoing" one or more applications of an AFTER journal entry. The target time can be any of the forms previously discussed. The recovery method is specified in the method parameter; see FIG. 18.

Figure 37:
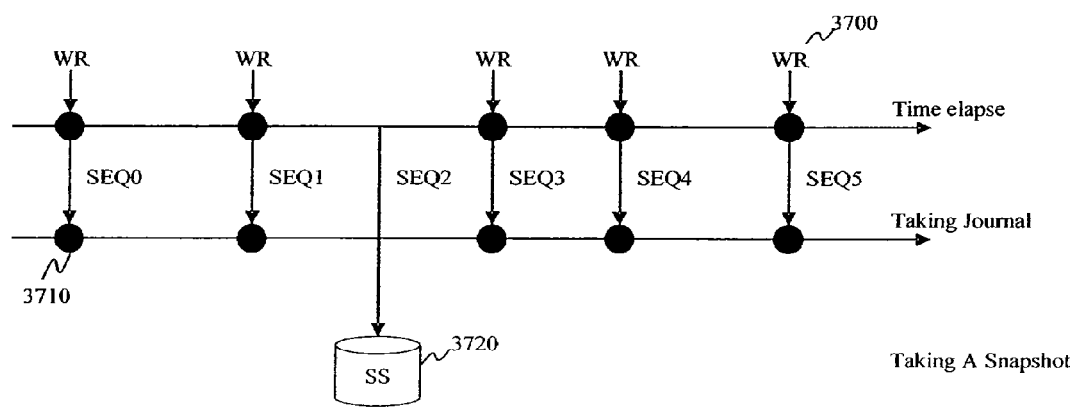
FIG. 37 shows the recording of AFTER journals and illustrates recovery using a single snapshot.

FIG. 37 illustrates the relationship between AFTER journal entries and snapshots. The snapshot 3720 represents the first snapshot image of the DVOL 101 belonging to a journal group 102. Note that AFTER journal entries (3710) having sequence numbers SEQ0 and SEQ1 have been made, and represent AFTER journal entries for two write operations. These entries show that journaling has been initiated at a time prior to the snapshot being taken. Thus, at a time corresponding to the sequence number SEQ2, the recovery manager 111 initiates the taking of a snapshot, and since journaling has been initiated, any write operations occurring during the taking of the snapshot are journaled. Thus, the write operations 3700 associated with the sequence numbers SEQ3 and higher show that those operations are being journaled. As an observation, the journal entries identified by sequence numbers SEQ0 and SEQ1 can be discarded or otherwise ignored.

Recovering data typically requires recovering the data state of at least a portion of the DVOL 101 at a specific time. Generally, this is accomplished by applying one or more AFETR journal entries to a snapshot that was taken earlier in time relative to the journal entries. In the disclosed illustrative embodiment, the sequence number SEQ 313 is incremented each time it is assigned to a journal entry or to a snapshot.

Figure 38:
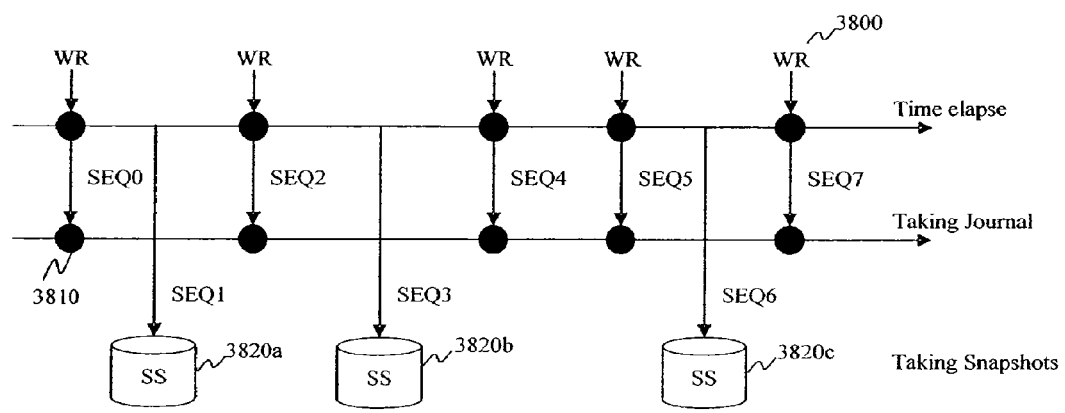
FIG. 38 shows the recording of AFTER journals and illustrates recovery using multiple snapshots.

FIG. 37 shows that a single snapshot is taken. All journal entries subsequent to that snapshot can then be applied to reconstruct the data state at a given time. In accordance with another aspect of the present invention, multiple snapshots can be taken. This is shown in FIG. 38 where multiple snapshots 3820a-3820c are taken. In accordance with the invention, each snapshot and journal entry is assigned a sequence number in the order in which the object (snapshot or journal entry) is recorded. It can be appreciated that there typically will be many AFTER journal entries 3810 recorded between each snapshot 3820a-3820c. Having multiple snapshots allows for quicker recovery time for restoring data. The snapshot closest in time to the target recovery time would be selected. The journal entries made subsequent to the snapshot could then be applied to restore the desired data state.

Figure 32:
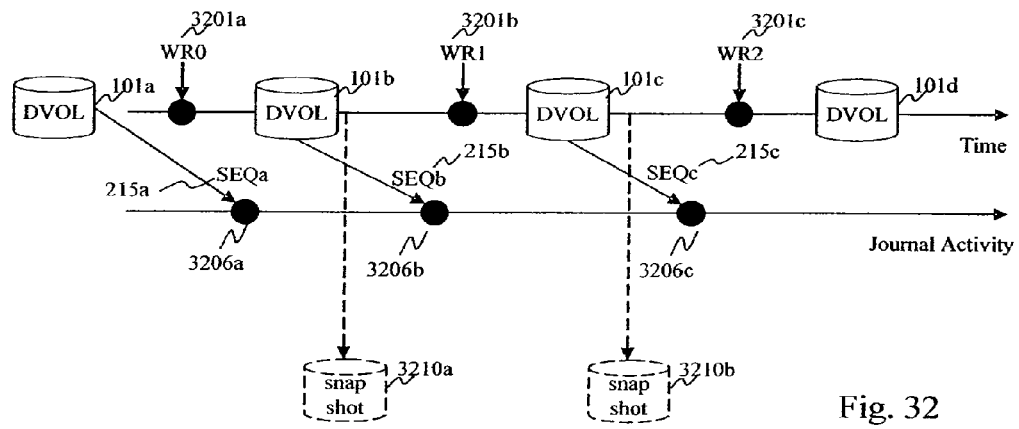
FIG. 32 shows the recording of BEFORE journals.

Refer now to FIG. 32 for a discussion of how BEFORE journals are collected and saved to the BJVOL 151. The figure shows a production volume DVOL 101. This is the volume that applications execution on a host 110 accesses. The DVOL 101a represents an initial data state of the production volume. At some time, the host 110 will issue a write operation WR0 to service an I/O request made by an application running on the host. The storage system 100 containing the production volume DVOL will service the write operation with the likely result that the data state of the DVOL will change; this is represented in FIG. 32 as DVOL 101b. Prior to actually writing the primary volume, the storage system (e.g., the controller 140) creates a BEFORE journal 3206a that records the data in DVOL 101a that is about to be changed by the write operation WR0. A sequence number 215a obtained from the sequence counter 313 is associated with the BEFORE journal 3206a. When the next write operation WR1 is issued, another BEFORE journal 3206b is created to record the portion of data in DVOL 101b that is going to be overwritten by the write operation WR1. The write operation WR1 is then serviced which then updates the data state of the DVOL, represented by DVOL 101c. A sequence counter 215b is associated with the journal 3206b. When yet another write operation WR2 is received, another BEFORE journal 3206c is created to record the portion of DVOL 101c that will be overwritten by the write operation WR2.

FIG. 32 also shows the occasional recording of a snapshot. For example, a snapshot 3210a is taken of the data state of the production indicated by DVOL 101b. Another snapshot 3210b is shown of the data state of the production indicated by DVOL 101c. These snapshots can be used for a "quick recovery" process as disclosed in more detail in co-pending U.S. application Ser. No. 10/621,791.

Figure 33:
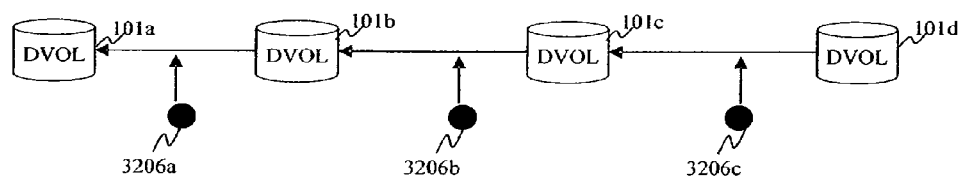
FIG. 33 shows updates using BEFORE journals.

FIG. 33 illustrates recovering a previous data state in a production volume using BEFORE journals. The recovery scenario begins with the current data state of the production volume. This is represented in the figure by DVOL 101d. The BEFORE journal 3206c contains the original data in the production volume before the production volume was updated by the write operation WR2 (FIG. 32). Thus, the data contained in the journal 3206c can be applied to the DVOL 101d to restore the original data, thus restoring the data state of the production volume represented by DVOL 101c. The data state represented by DVOL 101b can be recovered by applying the BEFORE journal 3206b to the DVOL 101c. Finally, the initial data state in DVOL 101a can be recovered by applying the BEFORE journal 3206a to the DVOL 101b. The user can recover an earlier data state of a production volume by sequentially applying BEFORE journals in this manner, beginning from the current data state of the production volume.

Various processing according to the present invention will now be discussed. In accordance with the illustrated embodiment of the present invention, the controller 140 is configured or otherwise operative to perform the functions and steps that will be described in the discussion that follows. It can be appreciated that logic, firmware, software, and combinations of the foregoing can be provided to allow the controller 140 to operate as needed. It can be further appreciated that processing components can be used to provide the following functionality other than the controller 140.

Referring now to FIG. 5, a generalized process flow is shown highlighting the steps for recovering data in accordance with the present invention. One will appreciate from the following that the described technique can be used to recover or otherwise retrieve a desired data state of a production volume. The recovery methods (FIG. 18) and apparatus disclosed herein are not limited to disaster recovery scenarios. The invention has applicability for users (e.g., system administrators) who might have a need to look at the state of a file or a directory at an earlier point in time. Accordingly, the term "recovery volume" is used in a generic sense to refer to one or more volumes on which the data recovery process is being performed.

It can be appreciated that the recovery manager 111 can include a suitable interface for interaction with a user. An appropriate interface might be a graphical user interface, or a command line interface. It can be appreciated that voice recognition technology and even virtual reality technology can be used as input and output components of the interface for interacting with a user. Alternatively, the "user" can be a machine (such as a data processing system) rather than a human. In such a case, a suitable machine-machine interface can be readily devised and implemented.

The first phase of the recovery process is referred to as phase I recovery ("fast" recovery). The idea is to quickly access the data state of the recovery volume at a point in time that is "close" in time to the desired data state, but is still prior in time to the desired data state. Then, a phase II recovery can be performed to get even closer to the desired data state. Phase II recovery is typically a much slower process than phase I recovery.

Referring to FIG. 5, processing for an AFTER journal is shown. In a step 510, the recovery manager 111 obtains from the user a "target time" that specifies a point in time that represents the desired data state, and a recovery method (FIG. 18). It is desirable to recover the data state of the production volume to a point in time that is as close as possible to, but not later than, the user-specified target time; that data state is referred to as the "desired data state." A suitable query to the user might inform the user as to the nature of the target time. For example, if the user interacted with a system administrator, she might tell the administrator that she was sure her files were not deleted until after 10:30 AM. The target time would then be 10:30 AM, or earlier. Likewise, a user interface can obtain such information from a user by presenting a suitable set of queries or prompts.

The recovery method is selected from among the methods shown in the table in FIG. 18. The table illustrates the user's decision-making for selecting a method for recovery. An initial inquiry (Q1) identifies which journal was used for the backup: AFTER journals, or BEFORE journals. The next inquiry (Q2) is the granularity of recovery that is desired: file-level recovery, or volume-level recovery. The next inquiry (Q3) is whether the user wants "re-recovery" capability or not. This inquiry (Q3) is directed to whether the user wants to be able to repeat the recovery operation; this is especially useful in a situation where the storage system fails during a recovery procedure. The idea of "re-recovery" allows a user to restart the recover process that was in progress at the time of failure of the storage system. A final inquiry (Q4) is whether the data in the original DVOL 101 (production volume) is to be retained after the recovery operation. Depending on whether the user's response is affirmative or negative for each inquiry, a suitable recovery method can be determined.

Note in the table in FIG. 18 that there is no Method 3. Instead, there is a Method 4'.

Returning to step 510 of FIG. 5, given the user-specified target time, the recovery manager can then issue a RECOVER_PH1 operation to the storage system (e.g., system 100, FIG. 1) that contains the recovery volume. In response, the storage system would initiate phase I recovery. Two conditions are checked to determine whether recovery is possible:

(1) a good snapshot exists—A snapshot must have been taken between the oldest AFTER journal and most recent AFTER journal. As discussed above, every snapshot has a sequence number. The sequence number can be used to identify a suitable snapshot. If the sequence number of a candidate snapshot is greater than that of the oldest AFTER journal and smaller than that of the most recent AFTER journal, then the snapshot is suitable.

(2) phase I recovery target time is in scope—The target time that user specifies must be between the oldest journal and the newest journal.

In a step 520, phase I recovery is performed. This is discussed in more detail with reference to FIG. 6, discussed below. Upon completion of phase I recovery, the storage system 100 can signal the recovery manager to indicate phase I has completed. The recovery manager 111 would then issue a STOP_RECOVER operation to the storage system, step 530. In response, the storage system 100 would put the recovery volume into an online state. In the context of the present invention, the "online" state is taken to mean that the host device 110 is given access to the recovery volume.

Next, in a step 540, the user is given the opportunity to review the state of the data of the recovery volume to determine whether the desired data state has been recovered. For example, a file system check might be performed, the file system can be mounted, individual files can be inspected, and so on. By doing so, it is likely the host 110 will perform write operations to the volumes. Such update operations would have to be canceled in order to perform additional recovery; e.g., as in step 550. Therefore, as described in the STOP_RECOVER command, the storage system 100 starts taking before journal entries of write operations from host 110.

Continuing with step 540, the data state of the recovery volume in now recovered to some point in time prior to the time of the desired data state. This point in time is referred to as the "recovered time" of the recovery volume. It may be that additional recovery might be needed to reach the desired data state. If the desired data state has been reached then the recovery process is stopped ("end recovery"). If the desired data state is not reached, then processing proceeds to a step 502, where the user sets an appropriate target time A to be used in conjunction with the user-specified recovery method. This is discussed in further detail in FIG. 7.

In step 503, if the difference between the target time A and the recovered time of the recovery volume is less than some predetermined value, then phase II recovery commences. This includes taking the recovery volume to the "offline" state, step 504, and proceeding with a phase II recovery operation at step 550. If the difference is not less that the predetermined value, then processing proceeds to step 508, which will be discussed in greater detail in FIG. 9, to perform additional phase I recovery using the user specified recovery method (FIG. 18). Merely for purposes of explanation, however, a value of one hour is shown in the flowchart.

The decision step 503 determines if additional phase I recovery is needed. If the time difference is very large (e.g., >one hour), then it is more efficient to perform a phase I recovery ("fast recovery") to get closer to the data state of the production volume that is closest to user-specified target time but not later than the user-specified target time; this is the desired data state. On the other hand, if the time difference is small (e.g., <one hour), then phase II recovery can be deemed to be sufficiently practical to get even close to the desired data state.

The initiation of phase II recovery begins at step 550. This includes taking the recovery volume offline and applying one or more AFTER journal entries to the snapshot as before, in order to move the state of the recovered data forward in time. However, phase II processing includes the additional step of taking BEFORE journal entries. With BEFORE journaling turned on, a BEFORE journal entry is taken of the snapshot prior to updating the snapshot with an AFTER journal entry; one such BEFORE journal entry is taken for each AFTER journal entry. As mentioned above, a BEFORE journal entry records the data that is stored in the target location of the write operation. Consequently, the state of the snapshot is preserved in a BEFORE journal entry prior to updating the snapshot with an AFTER journal entry. Thus, pairs of BEFORE journal and AFTER journal entries are created during phase II recovery. In accordance with the invention, the sequence numbering provided by the sequence number (SEQ) 313 is associated with each BEFORE entry journal. Thus, the same sequence of numbers is applied to BEFORE journal entries as well as to AFTER journal entries and snapshots.

In a step 560, a STOP_RECOVER operation is issued to put the recovery volume in an online state. The user is then able to inspect the recovery volume. Based on the inspection, if the user determines in a step 570 that the desired data state of the recovery volume is achieved, then the recovery process is complete ("end recovery"). If the user determines that the desired data state is not achieved, then processing proceeds to step 507 where the user sets an appropriate target time B. This is discussed in further detail in connection with FIG. 8.

A determination is made in step 506 whether the target time B is a time earlier than the phase I recovery time. The phase I recovery time is a point in time of the production volume at the end of phase I recovery, which was reached at step 540. If the target time B is a time earlier than the phase I recovery time, then processing proceeds to step 508 (FIG. 9, to be discussed below) to perform the user-specified recovery method. On the other hand, if the target time B in step 506 is a time later than the phase I recovery time, then a determination is made in step 505 whether the target time B is a time earlier than the phase II recovery time (which is the point in time that is reached by the phase II operation).

In step 505, if the target time B is a time later than the phase II recovery time, then processing proceeds to the determination step 503. The test in step 503 is whether the difference between the target time B and the recovered time of the recovery volume exceeds the predetermined value (e.g., one hour). If the time difference exceeds the predetermined value, then processing proceeds to step 508; otherwise, additional phase II recovery is performed (step 504 and following).

If, in step 505, the target time B is a time that is earlier than the phase II recovery time, then it means that the recovery operation proceeded to a point in time beyond the user-specified target time. In that case, the snapshot updates are "undone" (step 580) by accessing one or more BEFORE journal entries to undo (or cancel) some of the phase II recovery. When some number of snapshot updates have been "undone", then processing proceeds to step 560.

FIG. 5A shows recovery processing for a BEFORE journal. With two exceptions, the steps are identical to those discussed in FIG. 5 (AFTER journal).

A determination is made in a step 506' whether the target time B is a time later than the phase I recovery time. Recall that the phase I recovery time is a point in time of the production volume at the end of phase I recovery, which was reached at step 540. If the target time B is a time later than the phase I recovery time, then processing proceeds to step 508 (FIG. 9, to be discussed below) to perform the user-specified recovery method. On the other hand, if the target time B in step 506' is a time earlier than the phase I recovery time, then a determination is made in step 505' whether the target time B is a time earlier than the phase II recovery time (which is the point in time that is reached by the phase II operation).

In step 505', if the target time B is a time earlier than the phase II recovery time, then processing proceeds to the determination step 503. Recall that the test in step 503 is whether the difference between the target time B and the recovered time of the recovery volume exceeds the predetermined value (e.g., one hour). If the time difference exceeds the predetermined value, then processing proceeds to step 508; otherwise, additional phase II recovery is performed (step 504 and following).

If, in step 505', the target time B is a time that is later than the phase II recovery time, then it means that the recovery operation proceeded to a point in time beyond the user-specified target time. In that case, the snapshot updates are "undone" (step 580) by accessing one or more BEFORE journal entries to undo (or cancel) some of the phase II recovery. When some number of snapshot updates have been "undone", then processing proceeds to step 560.

Figure 34:
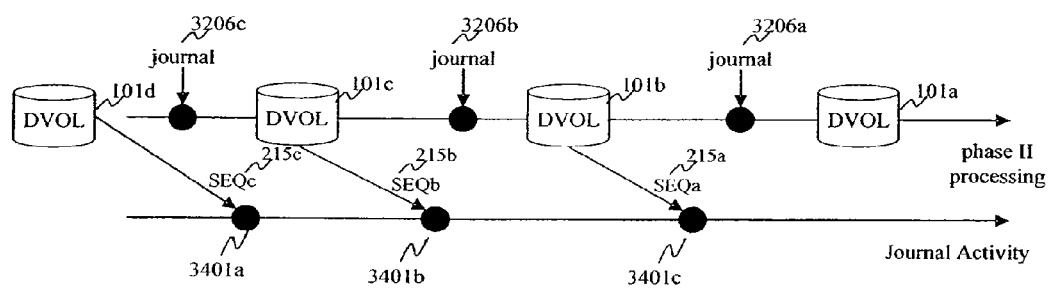
FIG. 34 shows the recording of BEFORE journals during phase II processing.

Referring for a moment to FIG. 34, the recording of BEFORE journals during an "undo" process is illustrated. The current data state of the production volume is shown as DVOL 101*d*. A BEFORE journal 3206*c* (see FIG. 32) is applied to the volume to update the volume to produce an earlier data state DVOL 101*c*. A BEFORE journal 3401*a* is recorded prior to updating the production volume at DVOL 101*d*. A sequence number 215*c* obtained from the BEFORE journal 3206*c* is associated with the BEFORE journal 3401*a*. When the next BEFORE journal 3206*b* is about to be applied to DVOL 101*c* to produce the next earlier data state DVOL 101*b*, another BEFORE journal 3401*b* is created to record the portion of data in DVOL 101*c* that is going to be overwritten by the update. A sequence counter 215*b* is associated with the journal 3401*b*. When yet another BEFORE journal 3206*a* is about to be applied to DVOL 101*b*, another BEFORE journal 3401*c* is created to record the portion of DVOL 101*b* that will be overwritten by the update operation that will be performed to produce DVOL 101*a*.

Referring for a moment to FIG. 39, the contents of the recovery table 170 (FIG. 1) are described. The recovery table 170 has a target time 3902, a Recovered time 3903, a Time of the oldest journal 3904, a Time of the newest journal 3905 and a phase I recovery time 3906 for each Journal Group ID 3901. The Target Time 3902 is provided by a user. Controller 140 gets Recovered Time 3903 from JH_TIME 214 or SS_TIME 352 when controller 140 applies journal to recovery volume or copies snapshot to recovery volume. Controller 140 gets Time of the oldest journal 3904 from JH_TIME 214 of first AFTER journal after taking first snapshot or first BEFOR journal. Controller 140 gets Time of the newest journal 3905 from JH_TIME 214 of newest journal in journal header area 210 when recovery is started. Controller 140 gets phase I recovery time 3906 from JH_TIME 214 of last journal or SS_TIME 352 of last snapshot when phase I recovery is done. Controller 140 gets Journal Group ID 3901 from GRID 310.

Refer now to FIG. 6 for a discussion of phase I recovery (invoked from step 520). A determination is made as to the user-specified recovery method in step 601. Step 605 is performed for methods 1, 2, 7, 8, and 10. As can be seen in FIG. 18, these methods call for saving an image of the DVOL. Hence in step 605, a snapshot of the DVOL 101 is made and stored to a temporary volume selected from the volume pool 150. If a snapshot of the DVOL 101 cannot be made (step 606), then a suitable error recovery process is performed, step 607; otherwise processing proceeds to the decision step 608.

If the user-specified method is 5, 6, or 9, no snapshot is taken, and processing proceeds to the decision step 608.

If the user-specified method is 4 then a snapshot of the SVOL 107 is taken and stored to an available volume in the volume pool 150 (step 602). The volume SVOL 107 represents the volume from which recovery will be performed, as called for by recovery method 4. If a snapshot of the SVOL 107 cannot be made (step 603), then a suitable error recovery process is performed, step 604; otherwise processing proceeds to the decision step 608.

If the user-specified method is 11, then in a step 605*a* a snapshot of the DVOL 101 is made and stored to a temporary volume selected from the volume pool 150. If a snapshot of the DVOL 101 cannot be made (step 605*b*), then a suitable error recovery process is performed, step 605*c*; otherwise processing proceeds to a step 605*d*. In step 605*d*, a snapshot of the SVOL 107 is taken and stored to an available volume in the volume pool 150. If a snapshot of the SVOL 107 cannot be made (step 605*e*), then a suitable error recovery process is performed, step 605*f*; otherwise processing proceeds to the decision step 608.

In decision step 608, if the user-specified recovery method is 1 or 5, then the content of SVOL 107 is copied to the DVOL 101 in step 609. In a step 610, the recovery volume(s) (whether SVOL, or DVOL, or both, depending on the recovery method) is/are set to the "offline" state. A decision tree comprising steps 611-622 will invoke the appropriate recovery procedure. Note that it is understood that the recovery method 4 includes the variant method 4'. Thus, the module 615 is understood to include both recovery method 4 and method 4'.

Refer now to FIG. 7 for a description of a process for setting the target time A for an AFTER journal. The entry point is step 502 in FIG. 5. In step 701, if the user-specified recovery method is 2, or 6, then the user sets a desired target time for the recovery operation that is to be performed by the selected recovery method (step 702). If in step 704 the desired target time is later in time than the "recovered time" of the recovery volume, and the desired target time falls between the time of the oldest journal and the newest journal (FIG. 39), then the desired target time is set as the "target time A" and the process completes. Referring to FIG. 5, processing then continues to the decision step 503. If the decision step 704 is a negative outcome, then recovery methods 2 and 6 cannot be used. The user is returned to step 702 to re-enter another desired time value.

Returning to the decision step 701, if the user-specified recovery method is 1, 4, 5, or 11, then the user sets a desired target time for the recovery operation that is to be performed by the selected recovery method (step 703). If in step 705 the desired target time falls between the time of the oldest journal and the newest journal, then the desired target time is set as the "target time A" and the process completes. If the decision step 705 is a negative outcome, then the user is returned to step 703 to re-enter another desired time value.

FIG. 7A shows the setting of target time A for a BEFORE journal. The entry point is step 502 in FIG. 5A. In step 701, if the user-specified recovery method is 9, then the user sets a desired target time for the recovery operation that is to be performed by the selected recovery method (step 702). If in step 704' the desired target time is earlier in time than the "recovered time" of the recovery volume, and the desired target time falls between the time of the oldest journal and the newest journal (FIG. 39), then the desired target time is set as the "target time A" and the process completes. Referring to FIG. 5A, processing then continues to the decision step 503. If the decision step 704' is a negative outcome, then recovery method 9 cannot be used. The user is returned to step 702 to re-enter another desired time value.

Returning to the decision step 701, if the user-specified recovery method is 7, 8, or 10, then the user sets a desired target time for the recovery operation that is to be performed by the selected recovery method (step 703). If in step 705 the desired target time falls between the time of the oldest journal and the newest journal, then the desired target time is set as the "target time A" and the process completes. If the decision step 705 is a negative outcome, then the user is returned to step 703 to re-enter another desired time value.

Refer now to FIG. 8 for a description of a process for setting the target time B for an AFTER journal. The entry point is step 507 in FIG. 5. In step 801, if the user-specified recovery method is 2, 6, then the user sets a desired target time for the recovery operation that is to be performed by the selected recovery method (step 802). If in step 804 the desired target time is later in time than the phase I recovered time, and the desired target time falls between the time of the oldest journal and the newest journal, then the desired target time is set as the "target time B" and the process completes. Referring to FIG. 5, processing then continues to the decision step 506. If the decision step 804 is a negative outcome, then the user is returned to step 802 to re-enter another desired time value.

Returning to the decision step 801, if the user-specified recovery method is 1, 4, 5, 7, or 11, then the user sets a desired target time for the recovery operation that is to be performed by the selected recovery method (step 803). If in step 805 the desired target time falls between the time of the oldest journal and the newest journal, then the desired target time is set as the "target time B" and the process completes. If the decision step 805 is a negative outcome, then the user is returned to step 803 to re-enter another desired time value.

Refer now to FIG. 8A for a description of a process for setting the target time B for a BEFORE journal. The entry point is step 507 in FIG. 5A. In step 801, if the user-specified recovery method is 9, then the user sets a desired target time for the recovery operation that is to be performed by the selected recovery method (step 802). If in step 804' the desired target time is earlier in time than the phase I recovered time, and the desired target time falls between the time of the oldest journal and the newest journal, then the desired target time is set as the "target time B" and the process completes. Referring to FIG. 5A, processing then continues to the decision step 506'. If the decision step 804' is a negative outcome, then the user is returned to step 802 to re-enter another desired time value.

Returning to the decision step 801, if the user-specified recovery method is 7, 8, or 10, then the user sets a desired target time for the recovery operation that is to be performed by the selected recovery method (step 803). If in step 805 the desired target time falls between the time of the oldest journal and the newest journal, then the desired target time is set as the "target time B" and the process completes. If the decision step 805 is a negative outcome, then the user is returned to step 803 to re-enter another desired time value.

FIG. 9 is a branch tree for invoking the procedure that corresponds to the user-specified recovery method. For all methods, the appropriate recovery volumes are set in step 912 to the "offline" mode. Then in steps 902 to 914, the appropriate process is invoked to perform the user-specified recovery method.

The discussion will now turn to a description of the various recovery methods. As can be seen from the process flow of FIG. 5, the recovery methods to be discussed can be invoked either from step 520 or step 503 (phase I recovery), or from step 506 which occurs during phase II recovery. In some of the recovery methods that will be discussed, a decision point may be needed to perform different processing depending on whether the particular recovery method was invoked in phase I recovery (step 520, or step 503) or in phase II recovery (step 506).

Recovery Method 1

Figure 10:
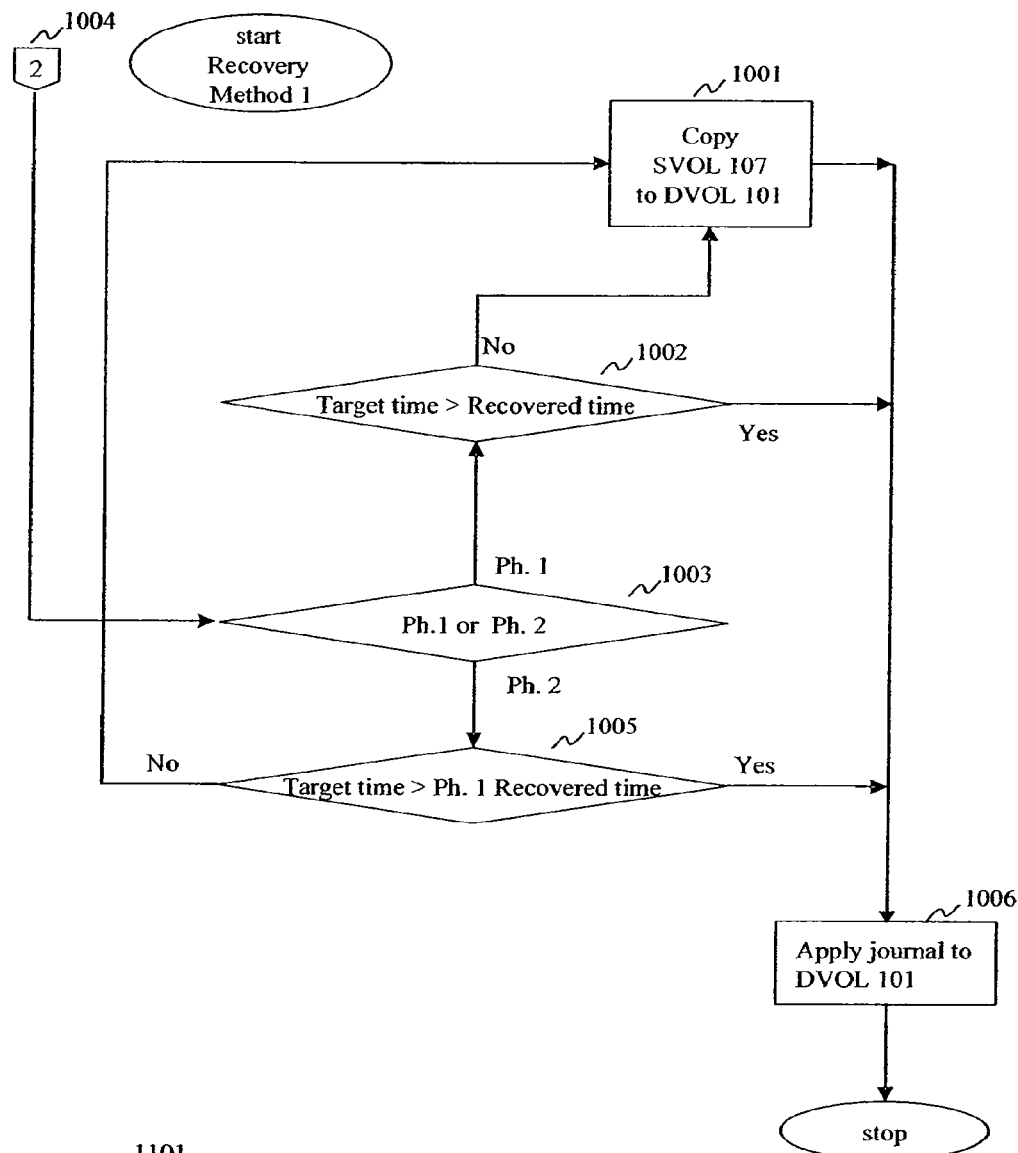
FIG. 10 highlights the process flow for recovery method 1.

FIGS. 10 and 19 show details for recovery method 1. A determination is made in step 1003 whether the recovery is in the phase I or phase II stage. If the recovery is in phase I, then a determination is made in step 1002 whether the desired target time (target time A) is a time later than the user-specified phase I recovery target time. If the target time A is not later than the user-specified phase I recovery time, then in step 1001 the content of a desired snapshot stored on the SVOL 107 is copied to the DVOL 101 of interest; otherwise, the process proceeds to step 1006. The desired snapshot that is copied is an earlier data state of the production volume DVOL 101 that was specified by the user, from which the recovery is made. If the recovery is in phase II, then a determination is made in step 1005 whether the desired target time (target time A) is a time later than the phase I recovered time. If it is not, then in step 1001 the snapshot stored in SVOL 107 is copied to DVOL 101; otherwise, the process proceeds to step 1006 where AFTER journals are applied to the DVOL 101, thus updating the DVOL to obtain a desired data state in the DVOL. The desired data state is a data state of the production volume at a point in time between the time of the earlier data state of the production volume and the time of the data state of the production volume when the recovery process was initiated by the user.

FIG. 19 shows the data flows that relate to this recovery method, including the processing that takes place as shown in FIGS. 5-8. In the first flow (1), a snapshot of the current data state of the production volume DVOL 101 is saved (1901) to an available volume in the volume pool 150. Recovery from an earlier data state of the production volume is desired by the user. Second (2), a snapshot of this earlier data state which is stored on SVOL 107 is copied (1902) to the DVOL 101, thus restoring the production volume to the earlier data state. Third (3), AFTER journal entries are applied (1903) to the DVOL, thus updating the DVOL to recover the desired data state. A user can subsequently access the production volume DVOL 101 in its recovered data state to perform recovery operations.

This recovery method is capable of re-recovery because the original snapshot on SVOL 107 can be copied to the DVOL if a failure occurred, thus allowing the user to retry the recovery operation. This recovery method can recover the entire volume. This recovery method provides "volume protection" which refers to the preservation of the data state of the recovery volume (in this case the DVOL) at a time prior to the commencement of the recovery operation. The volume pool 150 contains the data state of the production volume.

Recovery Method 2

Figure 11:
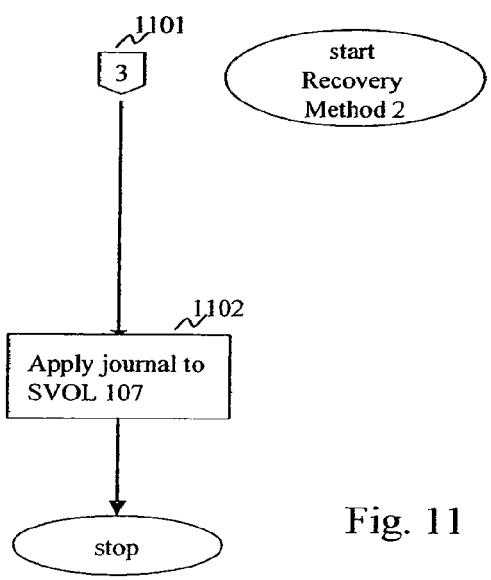
FIG. 11 highlights the process flow for recovery method 2.

FIGS. 11 and 20 show details for recovery method 2. This method does not rely on whether phase I or phase II recovery is in being performed. In this case, AFTER journals are applied to a stored snapshot in the SVOL 107 that represents an earlier data state of the production volume DVOL 101. Application of the AFTER journals updates the data state of the snapshot. The updates continue until a desired data state of the snapshot in SVOL 107 is obtained.

FIG. 20 shows the data flows that relate to this recovery method, including the processing that takes place as shown in FIGS. 5-8. As can be seen in FIG. 20, a snapshot of the current data state of the DVOL 101 is taken and stored in an available area in the volume pool 150. AFTER journals from the AJVOL 106 are then applied (2002) to the stored snapshot on the SVOL 107, thus updating the data state of the snapshot until eventually the desired data state is obtained. The final updated snapshot (referred to as the "recovered volume") is then copied (2003) to the DVOL, thus setting the DVOL (production volume) to the desired data state where the user can inspect the production volume in that data state.

This recovery method is not capable of re-recovery because the recovery operation is performed directly on the original snapshot that was stored in the SVOL 107; a copy of the snapshot was not taken before commencing with the recovery operation. This recovery method can recover the entire DVOL or specified fields. There is volume protection for DVOL by virtue of its original data state having been preserved by the snapshot that is stored in the volume pool 150.

Recovery Method 3

As mentioned above, there is no Method 3. Instead, reference is made to Method 4'.

Recovery Methods 4 and 4'

Figure 12:
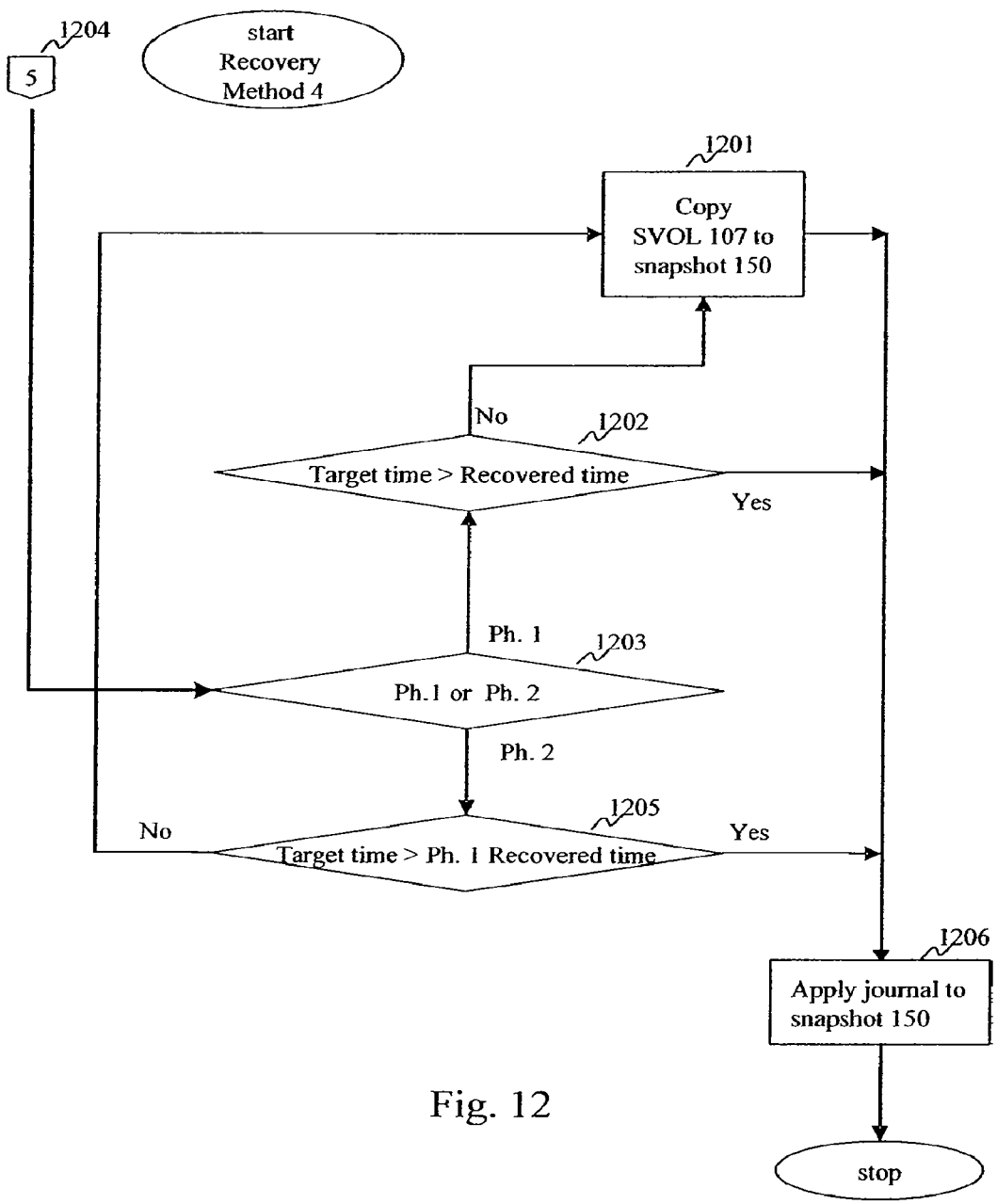

FIGS. 12, 21, and 22 show details for recovery methods 4 and 4'. A determination is made in step 1203 whether the recovery is in the phase I or phase II stage. If the recovery is in phase I, then a determination is made in step 1202 whether the desired target time (target time A) is a time later than the user-specified phase I recovery target time. If the target time A is not later than the user-specified phase I recovery time, then in step 1201 the content of a desired snapshot stored on the SVOL 107 is copied to the volume pool 150; otherwise, the process proceeds to step 1206. The desired snapshot is an earlier data state of the production volume DVOL 101, from which recovery is performed. If the recovery is in phase II, then a determination is made in step 1205 whether the desired target time (target time A) is a time later than the phase I recovered time. If it is not, then in step 1201 the snapshot in SVOL 107 is copied to the volume pool 150; otherwise, the process proceeds to step 1206 to apply AFTER journals to the snapshot stored in the volume pool 150 to update the snapshot. At some point a desired data state of the updated snapshot is obtained.

FIG. 21 shows the data flows that relate to this recovery method, including the processing that takes place as shown in FIGS. 5-8. The desired snapshot that is stored in SVOL 107 is copied (2101) to the volume pool 150. AFTER journal entries from the AJVOL 106 are applied (2102) to the snapshot in the volume pool 150 to update the snapshot producing a recovered volume having the desired data state. When the recovered data state is obtained, the recovered volume is then copied (2103) from the volume pool 150 to the production volume DVOL. The data state of the production volume is thus set to the desired data state so that a user can access the DVOL in the desired data state.

This recovery method is capable of re-recovery because journals are applied to a copy of the snapshot in the volume pool 150, not to the original snapshot in the SVOL 107. This recovery method can recover the entire volume, or specified files. This recovery method does not provide "volume protection" of the DVOL since it is overwritten by the updated snapshot from the volume pool 150 (step 2103).

FIG. 22 shows an alternative data flow for a variation of recovery method 4, referred to as recovery method 4'. The desired snapshot that is stored in SVOL 107 is copied (2101) to the volume pool 150. AFTER journal entries from the AJVOL 106 are applied (2102') to the snapshot in the SVOL 107 to update the snapshot to recover the desired data state. When the recovered data state is obtained, the updated snapshot is then copied (2103') from the SVOL to the DVOL. Re-recovery is provided by virtue of having saved a copy of the original snapshot stored in SVOL on the volume pool (step 2101).

Recovery Method 5

FIGS. 13 and 23 show details for recovery method 5. A determination is made in step 1303 whether the recovery is in the phase I or phase II stage. If the recovery is in phase I, then a determination is made in step 1302 whether the desired target time (target time A) is a time later than the user-specified phase I recovery target time. If the target time A is not later than the user-specified phase I recovery time, then in step 1301 the content of a desired snapshot stored on the SVOL 107 is copied to the DVOL 101 of interest; otherwise, the process proceeds to step 1306. The desired snapshot that is copied is an earlier data state of the production volume DVOL 101 that was specified by the user, from which the recovery is made. If the recovery is in phase II, then a determination is made in step 1305 whether the desired target time (target time A) is a time later than the phase I recovered time. If it is not, then in step 1301 the snapshot stored in SVOL 107 is copied to DVOL 101; otherwise, the process proceeds to step 1306 where AFTER journals are applied to the DVOL 101, thus updating the DVOL to obtain a desired data state in the DVOL.

FIG. 23 shows the data flows that relate to this recovery method, including the processing that takes place as shown in FIGS. 5-8. The desired snapshot that is stored in SVOL 107 is copied (2301) to the DVOL 101, thus restoring the production volume to an earlier data state of the production volume represented by the snapshot. AFTER journal entries from the AJVOL 106 are applied (2302) to the DVOL to update the DVOL until the desired data state in DVOL is recovered. When the recovered data state is obtained, a user can then access the recovered DVOL.

This recovery method is capable of re-recovery because journals are applied to a copy of the snapshot in the DVOL, not to the original snapshot in the SVOL 107. This recovery method can recover the entire volume. This recovery method does not provide "volume protection" of the DVOL since it is overwritten by the snapshot from the SVOL (step 2301).

Recovery Method 6

FIGS. 14 and 24 show details for recovery method 6. This method does not rely on whether phase I or phase II recovery is in being performed. In this case, AFTER journals are applied to a stored snapshot in the SVOL 107 that represents an earlier data state of the production volume DVOL 101. Application of the AFTER journals updates the data state of the snapshot. The updates continue until a desired data state of the snapshot in SVOL 107 is obtained.

FIG. 24 shows the data flows that relate to this recovery method, including the processing that takes place as shown in FIGS. 5-8. As can be seen in FIG. 24, AFTER journals from the AJVOL 106 are applied (2401) to the stored snapshot on the SVOL 107, thus updating the data state of the snapshot until eventually the desired data state is obtained. The final updated snapshot is then copied (2402) to the DVOL, where the user can inspect the volume.

This recovery method is not capable of re-recovery because the recovery operation is performed directly on the original snapshot that was stored in the SVOL 107; a copy of the snapshot was not taken before commencing with the recovery operation. This recovery method can recover the entire DVOL, or specified files. There is no volume protection for DVOL by virtue of its original data having been overwritten by the updated snapshot (step 2402) without first storing the original data.

Recovery Method 7

Figure 15:
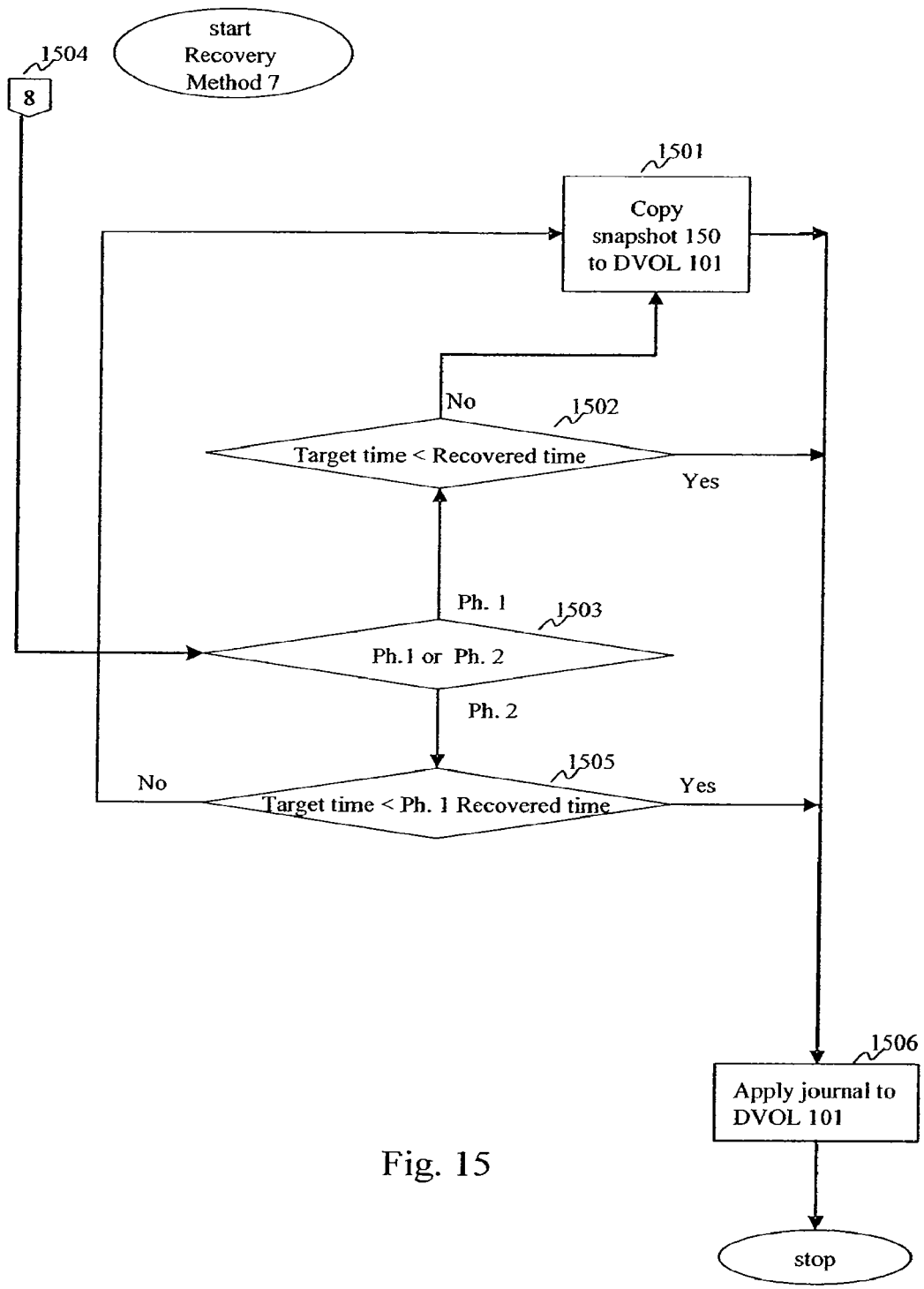

FIGS. 15 and 25 show details for recovery method 7. A determination is made in step 1503 whether the recovery is in the phase I or phase II stage. If the recovery is in phase I, then a determination is made in step 1502 whether the desired target time (target time A) is a time earlier than the user-specified phase I recovery target time. If the target time A is not later than the user-specified phase I recovery time, then in step 1501 a snapshot of the production volume DVOL 105 is copied to the volume pool 150; otherwise, the process proceeds to step 1506. If the recovery is in phase II, then a determination is made in step 1505 whether the desired target time (target time A) is a time earlier than the phase I recovered time. If it is not, then in step 1501 a snapshot of DVOL 101 is copied to the volume pool 150; otherwise, the process proceeds to step 1506 where BEFORE journals are applied to the DVOL 101, thus updating the DVOL to obtain a desired earlier data state of the production volume.

FIG. 25 shows the data flows that relate to this recovery method, including the processing that takes place as shown in FIGS. 5-8. A snapshot of the current data state of the production volume DVOL 101 is stored (2501) to the volume pool 150. Then, BEFORE journal entries from the BJVOL 151 are applied (2502) to the DVOL to update the DVOL until the desired earlier data state in DVOL is recovered. When the recovered earlier data state in the DVOL is reached, a user can then access the recovered DVOL in the desired data state.

This recovery method is capable of re-recovery because a snapshot of the DVOL is taken before applying the BEFORE journals. The current data state is thus preserved in the snapshot that is stored in the volume pool 150. This recovery method can recover the entire volume. This recovery method provides "volume protection" of the DVOL because of the snapshot that is saved in the volume pool 150.

Recovery Method 8

Figure 16:
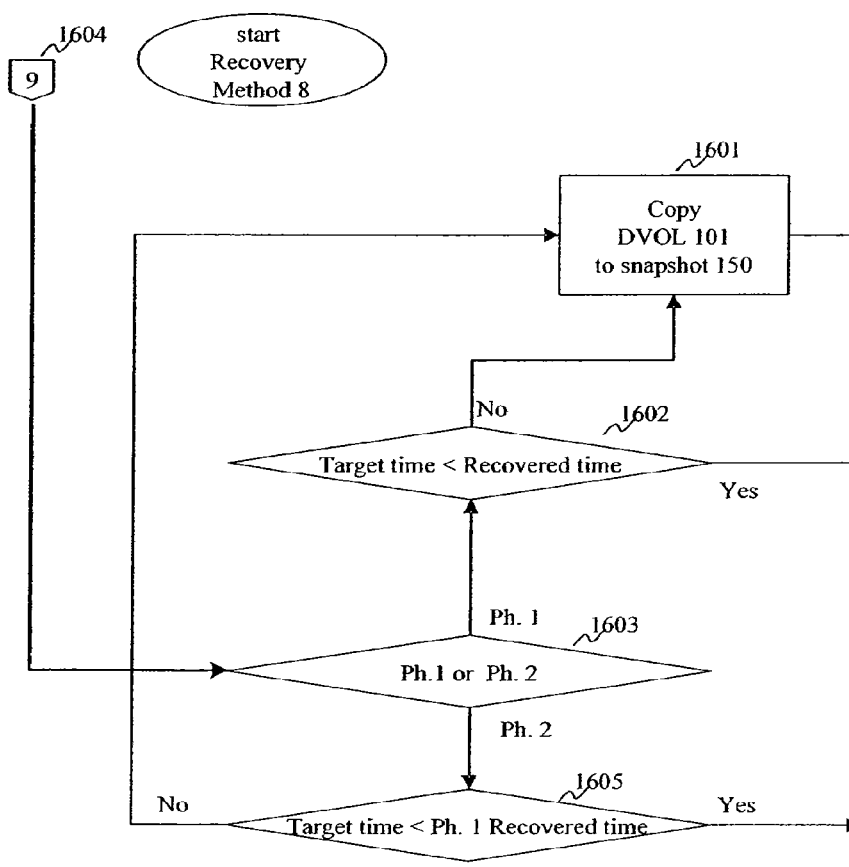

FIGS. 16 and 26 show details for recovery method 8. A determination is made in step 1603 whether the recovery is in the phase I or phase II stage. If the recovery is in phase I, then a determination is made in step 1602 whether the desired target time (target time A) is a time earlier than the user-specified phase I recovery target time. If the target time A is not later than the user-specified phase I recovery time, then in step 1601 a snapshot of the production volume DVOL 105 is copied to the volume pool 150; otherwise, the process proceeds to step 1606. If the recovery is in phase II, then a determination is made in step 1605 whether the desired target time (target time A) is a time earlier than the phase I recovered time. If it is not, then in step 1601 a snapshot of DVOL 101 is copied to the volume pool 150; otherwise, the process proceeds to step 1606 where BEFORE journals are applied to the snapshot stored in the volume pool 150, thus updating the snapshot to obtain a desired earlier data state of the production volume in the updated snapshot.

FIG. 26 shows the data flows that relate to this recovery method, including the processing that takes place as shown in FIGS. 5-8. A snapshot of the current data state of the production volume DVOL 101 is stored (2601) to the volume pool 150. Then, BEFORE journal entries from the BJVOL 151 are applied (2602) to the snapshot in the volume pool 150 to produce an updated snapshot. The snapshot is updated with BEFORE journals to produce a recovered volume. The updates continue until the desired earlier data state is recovered. When the earlier data state is obtained, the recovered volume is then copied (2603) to the DVOL, where a user can then access the production volume in its desired data state.

This recovery method is capable of re-recovery because the updates are performed on a snapshot of the DVOL, and not on the DVOL itself. The current data state is thus preserved on the DVOL. This recovery method can recover the entire volume, or specified files. This recovery method does not provide "volume protection" of the DVOL because it is copied over by the updated snapshot without first taking a snapshot of the DVOL that is not updated by the recovery method.

Recovery Method 9

Figure 17:
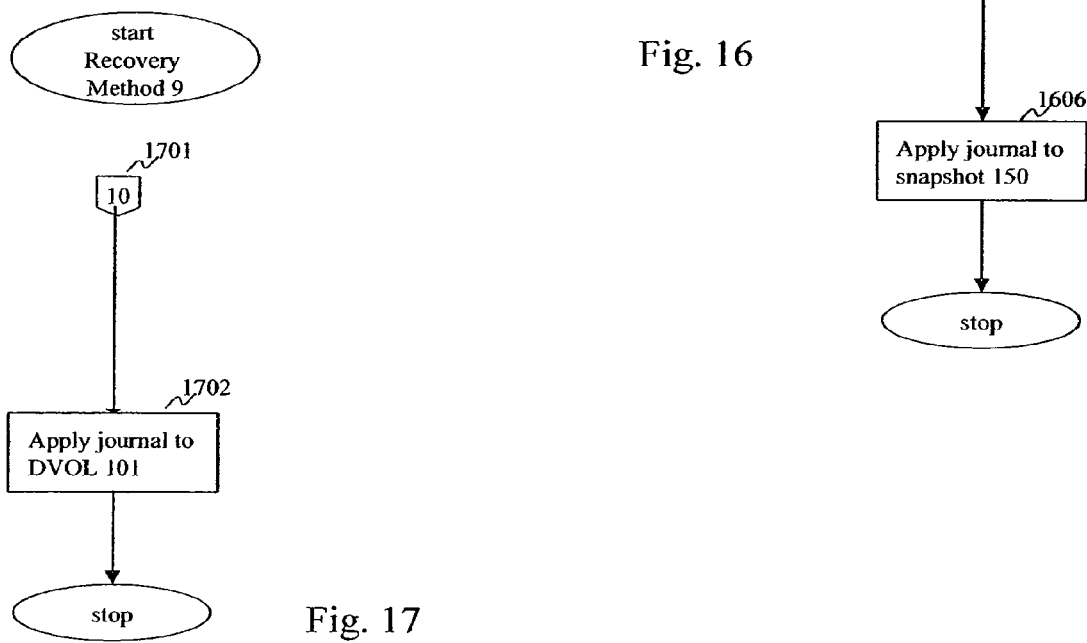

FIGS. 17 and 27 show details for recovery method 9. This method does not rely on whether phase I or phase II recovery is in being performed. In this case, BEFORE journals are applied to a stored snapshot in the DVOL 101.

FIG. 27 shows the data flows that relate to this recovery method, including the processing that takes place as shown in FIGS. 5-8. As can be seen in FIG. 27, BEFORE journals from the BJVOL 151 are applied (2701) to the DVOL 101, thus updating the data state of the DVOL until eventually the desired earlier data state is obtained.

This recovery method is not capable of re-recovery because the recovery operation is performed directly to the DVOL 101 without first taking a snapshot of the DVOL before commencing with the recovery operation; the current data state was not preserved. This recovery method can recover the entire DVOL to an earlier data state. There is no volume protection for DVOL because its original data state was not saved. It is noted that this recovery method consumes the least amount of storage since no snapshots are taken that would permit re-recovery or provide volume protection.

Recovery Method 10

Figure 30:
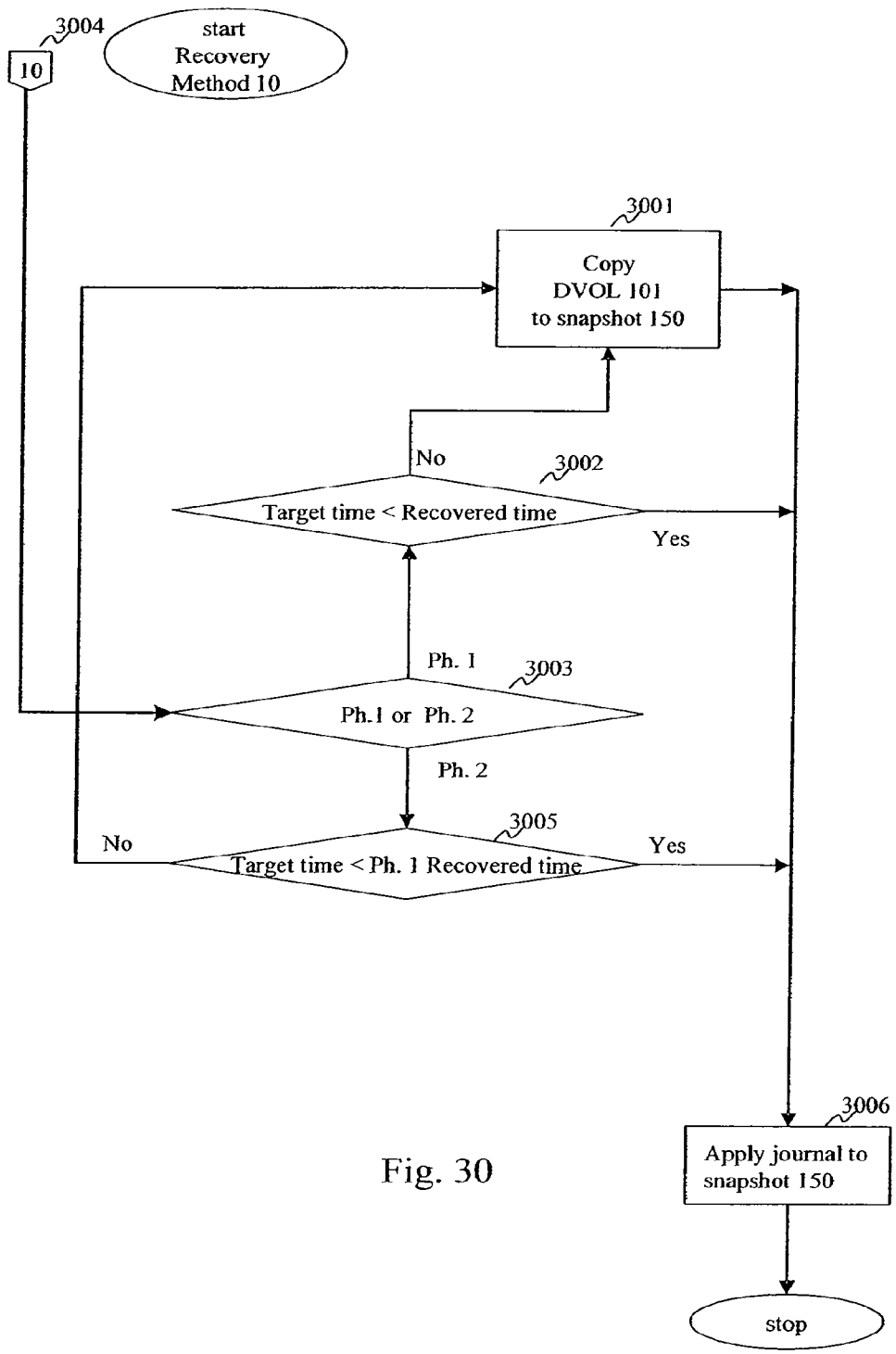
FIG. 30 highlights the process flow for recovery method 10.

FIGS. 30 and 28 show details for recovery method 10. A determination is made in step 3003 whether the recovery is in the phase I or phase II stage. If the recovery is in phase I, then a determination is made in step 3002 whether the desired target time (target time A) is a time earlier than the user-specified phase I recovery target time. If the target time A is not later than the user-specified phase I recovery time, then in step 3001 a snapshot of current data state of the production volume DVOL 101 is stored to the volume pool 150; otherwise, the process proceeds to step 3006. The desired snapshot that is copied is an earlier data state of the production volume DVOL 101 that was specified by the user, from which the recovery is made. If the recovery is in phase II, then a determination is made in step 3005 whether the desired target time (target time A) is a time earlier than the phase I recovered time. If it is not, then in step 3001 a snapshot of the production volume is stored to the volume pool 150; otherwise, the process proceeds to step 3006 where BEFORE journals are applied to the snapshot in the volume pool, thus updating the snapshot to obtain a desired earlier data state of the production volume.

FIG. 28 shows the data flows that relate to this recovery method, including the processing that takes place as shown in FIGS. 5-8. A first snapshot of the current data state of the production volume DVOL 101 is saved (2801) to an available volume in the volume pool 150. A second snapshot of the current data state of the production volume DVOL 101 is saved (2802) to an available volume in the volume pool 150. Recovery to an earlier data state in the production volume is obtained by applying (2803) BEFORE journals in the BJVOL 151 to the second snapshot, thus updating the second snapshot to produce a recovered volume. When the desired earlier data state in the recovered volume is reached, then it is copied to the DVOL, thus restoring the production volume to the desired data state so that a recovery operation can be performed.

This recovery method is capable of re-recovery because the original data state of the DVOL is preserved in the first snapshot, thus allowing the user to retry the recovery operation. This recovery method can recover the entire volume, or specified files. This recovery method provides "volume protection" because the volume pool 150 contains the data state of the production volume in the first snapshot.

Recovery Method 11

Figure 31:
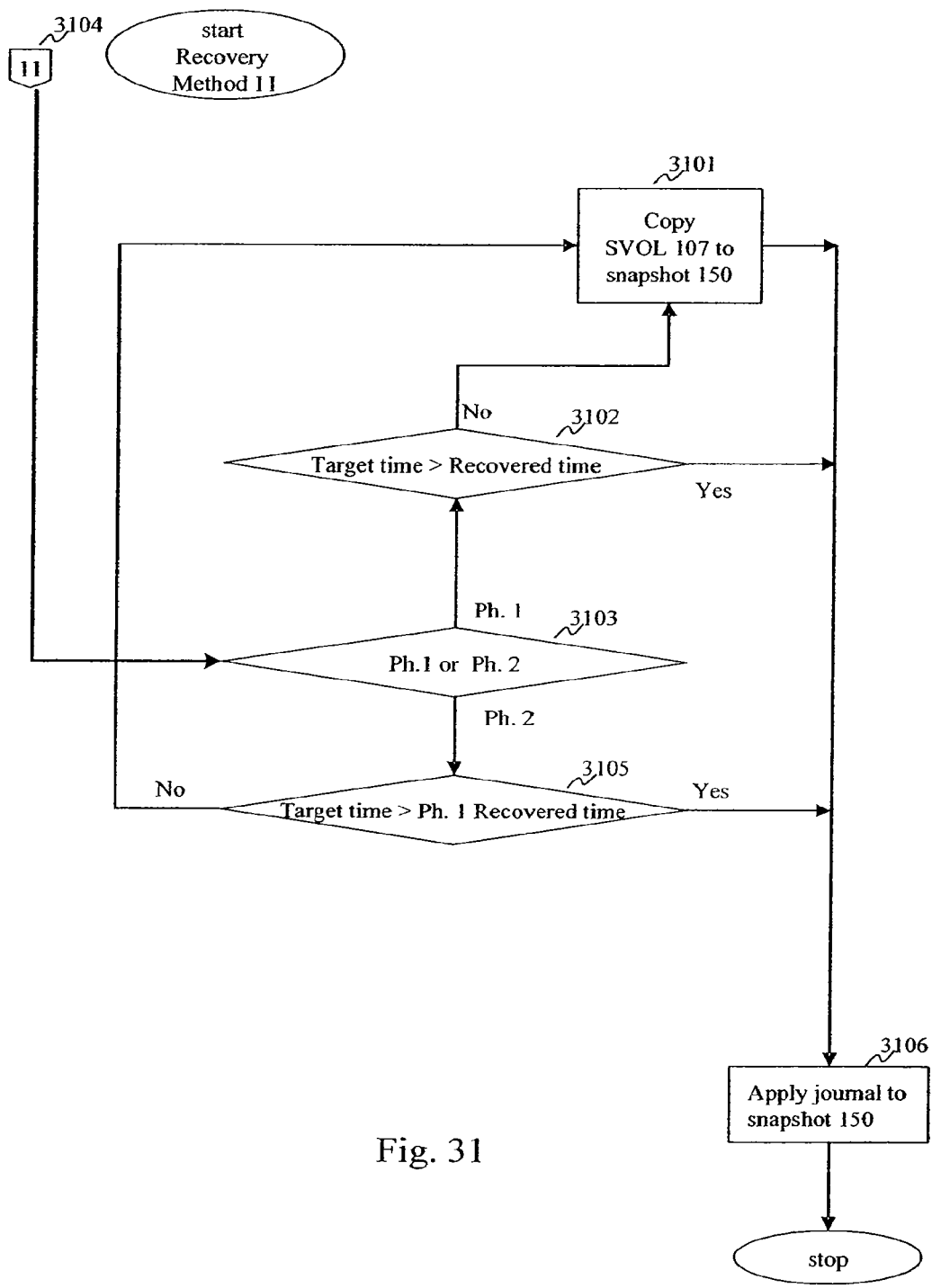
FIG. 31 highlights the process flow for recovery method 11.

FIGS. 31 and 29 show details for recovery method 11. A determination is made in step 3103 whether the recovery is in the phase I or phase II stage. If the recovery is in phase I, then a determination is made in step 3102 whether the desired target time (target time A) is a time later than the user-specified phase I recovery target time. If the target time A is not later than the user-specified phase I recovery time, then in step 3101 the content of a desired snapshot stored on the SVOL 107 is copied to the volume pool 150; otherwise, the process proceeds to step 3106. The desired snapshot that is copied is an earlier data state of the production volume DVOL 101 that was specified by the user, from which the recovery is made. If the recovery is in phase II, then a determination is made in step 3105 whether the desired target time (target time A) is a time later than the phase I recovered time. If it is not, then in step 3101 the snapshot stored in SVOL 107 is copied to the volume pool 150; otherwise, the process proceeds to step 3106 where BEFORE journals are applied to the snapshot in the volume pool, thus updating the snapshot to obtain a desired previous data state of the production volume.

FIG. 29 shows the data flows that relate to this recovery method, including the processing that takes place as shown in FIGS. 5-8. A snapshot (snapshot 1) of the current data state of the production volume DVOL 101 is saved (2901) to the volume pool 150. A snapshot (snapshot 2) of the desired snapshot in SVOL 107 is saved (2902) to the volume pool 150. AFTER journal entries from the AJVOL 106 are applied (2903) to the second snapshot (snapshot 2) in the volume pool 150 to update it to a point where the desired data state is obtained. When the desired data state of the updated second snapshot (snapshot 2) is reached, then that snapshot is copied (2904) to the DVOL where a user can access it.

This recovery method is capable of re-recovery because the updates with the AFTER journal entries are not applied to the original snapshot on SVOL 107, but rather to a snapshot of the snapshot, namely, snapshot 2. This recovery method can recover the entire volume, or specified files. This recovery method provides "volume protection" because the original state of the DVOL is preserved by snapshot 1.

FIG. 29A shows an another alternative data flow for a variation of recovery method 11, referred to as recovery method 11'. First, a snapshot of production volume DVOL is made to the volume pool 150 in a step 2901. The desired snapshot that is stored in SVOL 107 is copied (2902) to the volume pool 150. AFTER journal entries from the AJVOL 106 are applied (2903') to the snapshot in the SVOL 107 to update the snapshot to recover the desired data state. When the recovered data state is obtained, the updated snapshot is then copied (2904') from the SVOL to the DVOL. Re-recovery is provided by virtue of having saved a copy of the original snapshot stored in SVOL on the volume pool (step 2902).

Figure 35:
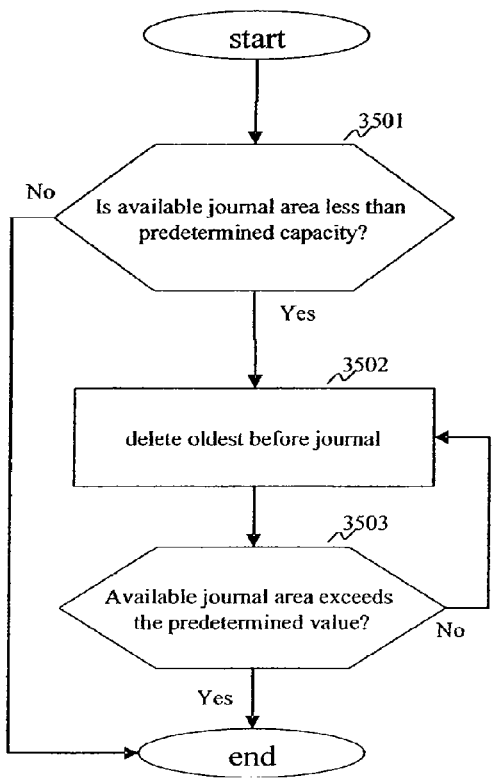
FIG. 35 highlights the process flow for overflow handling of BEFORE journals.

The discussion will now turn to detection and handling of overflow conditions in a journal volume. In co-pending U.S. application Ser. No. 10/621,791 handling for overflow in the journal volume for storing AFTER journals is described. FIG. 35 illustrates similar processing to detect and handle overflow conditions in the BEFORE journal volume. An "overflow" is deemed to exist when the available space in the BJVOL 151 falls below some predetermined threshold. It can be appreciated that many criteria can be used to determine if an overflow condition exists. A straightforward threshold is based on the total storage capacity of the journal volume(s) assigned for a journal group. When the free space becomes some percentage (say, 10%) of the total storage capacity, then an overflow condition exists. Another threshold might be used for each journal volume. In an aspect of the invention, the free space capacity in the journal volume(s) is periodically monitored. Alternatively, the free space can be monitored in an aperiodic manner. For example, the intervals between monitoring can be randomly spaced. As another example, the monitoring intervals can be spaced apart depending on the level of free space; i.e., the monitoring interval can vary as a function of the free space level.

FIG. 35 highlights an illustrative embodiment for overflow processing. In step 3501, the storage system periodically checks the total free space of the journal volume(s) 106; e.g., every ten seconds. The free space in the BJVOL 151 can easily be calculated since the pointers to the BJVOL in the management table 108 maintain the current state of the storage consumed by the BEFORE journal volumes. For example, the pointer JVOL_PTRb 333 points to the BEFORE journal entries 333a to 333h. In particular, JI_HEAD_VOL 333a and JI_HEAD_ADDR 33b can provide access to information as to the available space on BJVOL 151. If the free space is above the threshold, then the monitoring process simply waits for a period of time to pass and then repeats its check of the journal volume free space.

Figure 36:
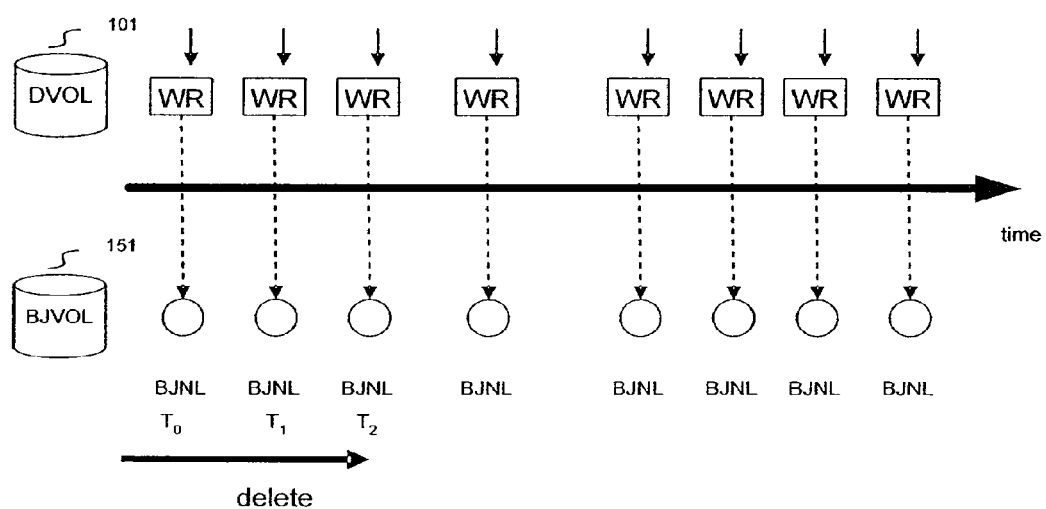
FIG. 36 illustrates storage recovery for overflowing BEFORE journals.

If the free space falls below a predetermined threshold, then in a step 3502 some of the BEFORE journal entries are simply deleted, beginning with the "oldest" journal entries. FIG. 36 shows a series of BEFORE journal entries BJNL that are created for each write operation WR made to the production volume DVOL 101. The journal entries are stored on BJVOL 151. The oldest journal entry shown in FIG. 36 is the entry at time $T_0$. That journal entry is deleted.

In step 3503, after deleting the journal entry, a check is made of the increase in the journal volume free space in BJVOL 151. The free space can be compared against the threshold criterion used in step 3501. Alternatively, a different threshold can be used. For example, here a higher amount of free space may be required to terminate this process than was used to initiate the process. This avoids invoking the process too frequently, but once invoked the second higher threshold encourages recovering as much free space as is reasonable. It can be appreciated that these thresholds can be determined empirically over time by an administrator.

If the threshold for stopping the process is met (i.e., free space exceeds threshold), then the process stops. Otherwise, step 3502 is repeated for the next oldest journal entry. Steps 3502 and 3503 are repeated until the free space level meets the threshold criterion used in step 3503.

What is claimed is:
1. A method for data recovery in a data storage system comprising:
receiving I/O requests from a host machine, the I/O requests being directed to a production volume, the I/O requests including write requests;
producing an original snapshot of the production volume, the original snapshot representative of a first data state of the production volume;
servicing the write requests, including performing write operations on the production volume to produce an updated production volume, the updated production volume having a second data state;
storing a plurality of first journal entries, each first journal entry corresponding to one of the write requests and containing data associated with the write request;
performing a recovery operation comprising steps of:
applying one or more first journal entries to the original snapshot to produce an updated snapshot, the updated snapshot having a third data state that is a data state of the production volume at a point in time between the first data state and the second data state; and
restoring the third data state on the production volume based on the updated snapshot by copying the updated snapshot to the production volume to the third data state so that the data recovery can be performed on the production volume in the third data state; and performing a re-recovery operation comprising steps of:

making a copy of the copy of the original snapshot to produce a second copy of the original snapshot;

applying the one or more first journal entries to the second copy of the original snapshot to produce a second updated snapshot; and copying the second updated snapshot to the production volume to restore the production volume to the third data state.

2. The method of claim 1, wherein the re-recovery operation can be performed if an error occurred during the step of applying the one or more first journal entries to the original snapshot.

3. The method of claim 1, further comprising:

producing a current snapshot of the updated production volume, the current snapshot representative of the second data state; and restoring the first data state on the production volume from the original snapshot, wherein the step of applying includes applying the one or more first journal entries to the production volume to restore the production volume to the third data state.

4. The method of claim 3, further comprising at a time subsequent to the data recovery, restoring the second data state of the production volume by copying the current snapshot to the production volume.

5. The method of claim 1 further comprising:

producing a copy of the original snapshot; applying the one or more first journal entries to the copy of the original snapshot to produce the updated snapshot; and copying the updated snapshot to the production volume to restore the production volume to the third data state.

6. The method of claim 1 further comprising:

copying the original snapshot to the production volume thereby restoring the production volume to the first data state; and applying the one or more first journal entries to the production volume thereby restoring the production volume to the third data state.

7. The method of claim 1 further comprising:

producing a current snapshot of the updated production volume, the current snapshot representative of the second data state;

producing a copy of the original snapshot;

applying the one or more first journal entries to the copy of the original snapshot to produce the updated snapshot; and copying the updated snapshot to the production volume.

8. A method for data recovery in a data storage system comprising:

receiving I/O requests from a host machine, the I/O requests being directed to a production volume, the I/O requests including write requests;

producing an original snapshot of the production volume, the original snapshot representative of a first data state of the production volume;

servicing the write requests including performing write operations on the production volume to produce an updated production volume, the updated production volume having a second data state;

storing a plurality of first journal entries, each first journal entry being associated with a write request and containing data in the production volume that is to be overwritten by the write request; performing a recovery operation comprising steps of:

producing a first copy of the updated production volume;

producing a second copy of the updated production volume;

applying one or more first journal entries to the second copy of the updated production volume to obtain a recovered volume having a third data state that is a data state of the production volume at a point in time earlier than the second data state; and restoring the third data state on the production volume based on the recovered volume by copying the recovered volume to the production volume to restore the production volume to the third data state so that the data recovery can be performed on the production volume in the third data state, and performing a re-recovery operation comprising steps of:

making a copy of the original snapshot to produce a first copy of the original snapshot;

applying the one or more first journal entries to the first copy of the original snapshot to produce a first updated snapshot; and copying the first updated snapshot to the production volume to restore the production volume to the third data state.

9. The method of claim 8, wherein the re-recovery operation can be performed if an error occurred during the step of applying the one or more first journal entries to the original snapshot.

10. The method of claim 8 further comprising:

storing a copy of the updated production volume on a second volume; and applying one or more first journal entries to the updated production volume so that the production volume is restored to the third data state.

11. The method of claim 8 further comprising:

storing a copy of the updated production volume on a second volume;

applying one or more first journal entries to the copy that is stored on the second volume to produce the recovered volume; and copying the recovered volume to the production volume to restore the production volume to the third data state.

12. The method of claim 8 wherein the one or more first journal entries are applied to the updated production volume to restore the production volume to the third data state.

* * * * *